United States Patent
Fukuzawa et al.

[11] Patent Number: 5,949,862
[45] Date of Patent: Sep. 7, 1999

[54] TRAFFIC MEASURING APPARATUS AND METHOD

[75] Inventors: Yohji Fukuzawa; Koji Kawase; Masami Ohta; Yasushi Shigesada; Kazuya Nishimura; Koji Kuriki, all of Fukuoka, Japan

[73] Assignee: Fujitsu Limited, Kanagawa, Japan

[21] Appl. No.: 08/949,152

[22] Filed: Oct. 10, 1997

[30] Foreign Application Priority Data

Apr. 24, 1997 [JP] Japan .................................. 9-107913

[51] Int. Cl.⁶ .................................................. H04M 15/00
[52] U.S. Cl. ........................................... 379/113; 379/134
[58] Field of Search .................................. 379/112, 113,
379/133, 134, 137, 138, 139; 370/232,
233, 234, 252, 253; 395/200.53, 200.54,
200.55

[56] References Cited

U.S. PATENT DOCUMENTS

| 4,156,109 | 5/1979 | Kraushaar et al. ............... 379/137 |
| 5,185,780 | 2/1993 | Leggett ............................. 379/134 |
| 5,425,086 | 6/1995 | Hidaka et al. .................... 379/113 |
| 5,574,770 | 11/1996 | Yoo et al. ........................ 379/113 |

FOREIGN PATENT DOCUMENTS

| 2-200049 | 8/1990 | Japan . |
| 7-336390 | 12/1995 | Japan . |

*Primary Examiner*—Paul Loomis
*Attorney, Agent, or Firm*—Helfgott & Karas

[57] ABSTRACT

A traffic measuring apparatus provided in an exchange measures traffic caused by call control for a plurality of terminals accommodated in the exchange. The traffic measuring apparatus includes a traffic measuring section for measuring traffic in accordance with a predetermined measuring method, a load measuring section for measuring a call control load, and a measuring method change control section for changing the measuring method used in the traffic measuring section to a different measuring method in accordance with the call control load measured by the load measuring section. Accordingly, it becomes possible to perform detailed traffic measurement, while minimizing the load acting on the call control.

13 Claims, 28 Drawing Sheets

FIG.4

| TRAFFIC MEASUREMENT ITEMS | SPECIFIC ITEMS TO BE COLLECTED |
|---|---|
| BASIC TRAFFIC | CC ACTIVITY RATIO |
| ROUTE TRAFFIC | TOTAL CALL NUMBER, CONNECTED CALL NUMBER, MEAN USE RATIO, ALTERNATIVE ROUTE CALL NUMBER, CALL AMOUNT |
| SUBSCRIBER TRAFFIC | TOTAL CALL NUMBER, FINISHED CALL NUMBER, UNFINISHED CALL NUMBER, CALL AMOUNT |
| LC TRAFFIC | CC ACTIVITY RATIO, CALLING-SIDE CALL AMOUNT, CALLED-SIDE CALL AMOUNT |
| SERVICE TRAFFIC | TOTAL CALL NUMBER, FINISHED CALL NUMBER |
| DEVICE TRAFFIC | TOTAL CALL NUMBER, CALL AMOUNT |
| ... | ... |

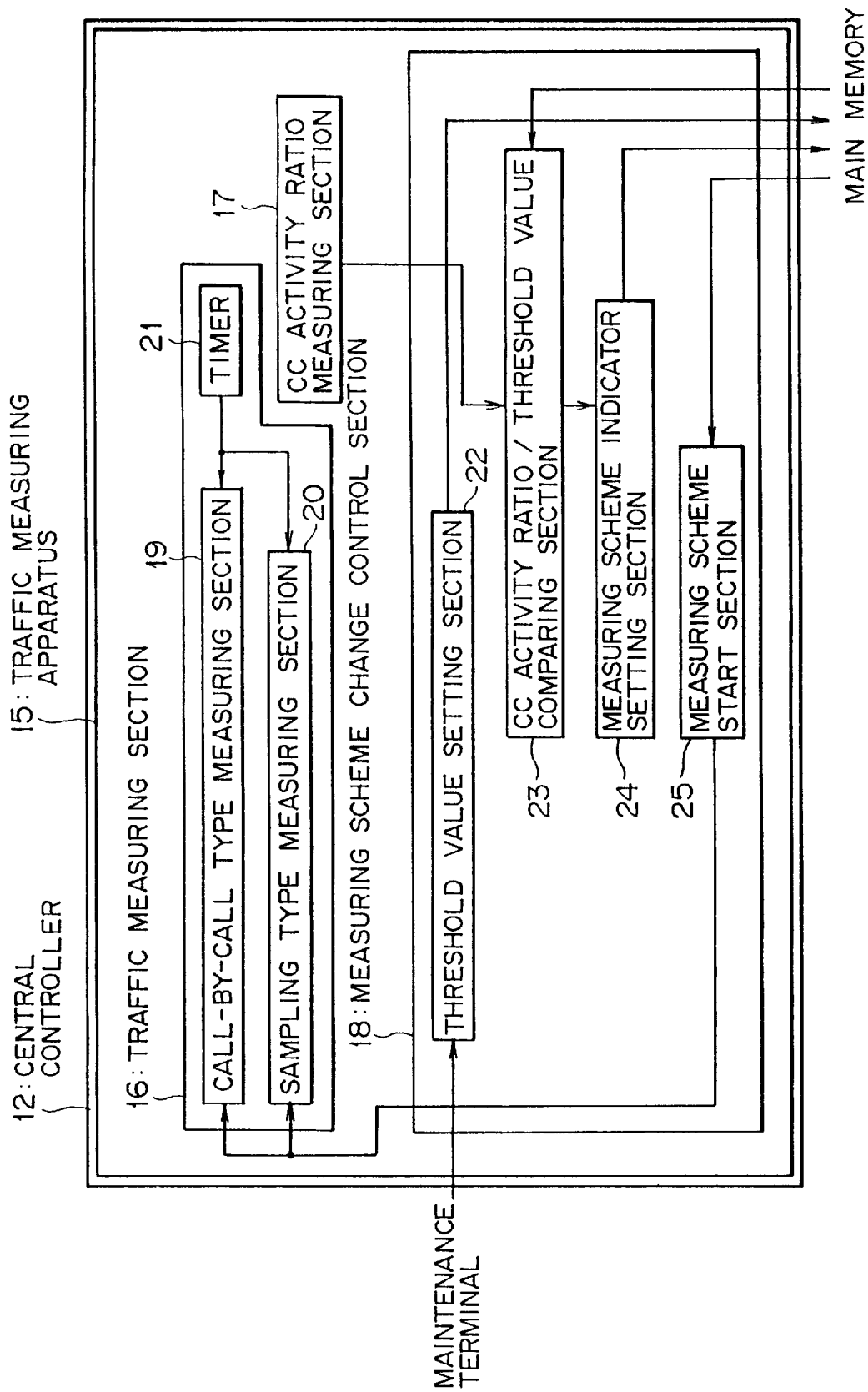

TRAFFIC MEASURING APPARATUS AND METHOD

BACKGROUND OF THE INVENTION (1) Field of the Invention

The present invention relates to a traffic measuring apparatus and method, and particularly to a traffic measuring apparatus and method for collecting information related to traffic caused by call control within an exchange.

(2) Description of the Related Art

Generally, various kinds of exchanges such as a station exchange are designed such that when the exchange provides call control for terminals accommodated in the exchange, a central controller (CC) of the exchange records within a main memory (MM) information on calls for the accommodated terminals over a predetermined period of time. Based on the call information, the central controller collects and creates various kinds of traffic information such as basic traffic information related to the activity ratio of the central controller, route traffic information, subscriber traffic information, and service traffic information as needed, and outputs the traffic information to a maintenance engineer (maintenance terminal) for the exchange at predetermined intervals (e.g., 15-minute intervals).

The traffic information is utilized as a reference for future design of exchanges, improvements of operation conditions, and measures against the occurrence of abnormality and congestion. For example, based on route traffic information, trunks are added/removed, restrictions are placed on alternative routes, and like actions are taken; based on the subscriber traffic information, new services to be provided for the subscribers or the like are determined; and based on the service traffic information, services are expanded/abolished and like actions are taken.

At present, in each exchange the above-described collection and creation of traffic information (traffic measurement) is performed through use of a call-by-call scheme or a sampling scheme. In the call-by-call scheme, traffic information is collected with reference to call information in the memory device whenever a call is generated for the accommodated terminals. In the sampling scheme, traffic information is collected with reference to all call information at constant intervals without regard to the generation of calls.

However, in traffic measurement utilizing the call-by-call scheme, traffic information is collected upon generation of each call. Therefore, although the measurement results (traffic measurement values) are extremely accurate and reliable, the load of the traffic measurement process itself increases in proportion to the number of calls. Accordingly, if the running level (the priority imparted to execution of a traffic measurement program) is set to the same level as the running level of call processing, there arises a chance that call processing, which must be performed preferentially, is adversely affected, resulting in an increase in the loss probability, for example.

Therefore, in order to reduce the influence of the traffic measurement processing on call processing, the running level of the traffic measurement processing is generally set to be lower than that of the call processing. In this case, if a heavy load state of the call processing continues, traffic measurement processing is maintained in a waiting state for a prolonged period of time, with the result that traffic measurement may not be completed within a predetermined period of time (e.g., within 15 minutes). In this case, the central controller outputs to a maintenance terminal the collected information at a time after the call processing load decreases to a predetermined level (e.g., after one hour).

That is, in the call-by-call scheme, when call processing is in a heavy load state, traffic measurement requires a very long time to complete, with the result that measurement results cannot be obtained at short intervals (e.g., 15-minute intervals).

Meanwhile, in traffic measurement employing the sampling scheme, since traffic information is collected at constant intervals without regard to the generation of calls, the traffic measurement processing load is always constant and low regardless of the number of calls, so that measurement can be completed within a short period of time (15 minutes) even when call processing is in the high load state. However, since traffic information is thinned down in terms of time for collection thereof, the overall reliability and precision of the measurement results become lower than those in the call-by-call scheme.

Since the traffic measurement performed in conventional exchanges fixedly utilizes either the call-by-call scheme or the sampling scheme but not both, the traffic measurement can be performed while importance is attached to either securing high reliability of results of traffic measurement or shortening the traffic measurement period, but not both. Therefore, detailed traffic measurement cannot be performed flexibly.

SUMMARY OF THE INVENTION

The present invention has been conceived in view of the aforementioned drawbacks, and an object of the present invention is to provide a traffic measuring apparatus and method that carry out traffic measurement in accordance with the load state of call processing in order to enable detailed traffic measurement while minimizing the load acting on call processing.

To this end, the present invention provides a traffic measuring apparatus provided in an exchange for measuring traffic caused by call control for a plurality of terminals accommodated in the exchange, comprising: a traffic measuring section for measuring traffic in accordance with a predetermined measuring method; a load measuring section for measuring a call control load; and a measuring method change control section for changing the measuring method used in the traffic measuring section to a different measuring method in accordance with the call control load measured by the load measuring section.

The present invention also provides a traffic measuring apparatus provided in an exchange for measuring traffic caused by call control for a plurality of terminals accommodated in the exchange, the apparatus comprising: a traffic measuring section capable of measuring traffic in accordance with a plurality of kinds of measuring methods; a load measuring section for measuring a call control load; and a measuring method selecting section for selecting one of the measuring methods in accordance with the call control load measured by the load measuring section, the traffic measuring section measuring traffic in accordance with the selected measuring method.

The present invention further provides a traffic measuring apparatus provided in an exchange for measuring traffic caused by call control for a plurality of terminals accommodated in the exchange, comprising means for measuring traffic in accordance with a measuring method corresponding to a call control load.

The present invention further provides a traffic measuring method adapted to an exchange for measuring traffic caused by call control for a plurality of terminals accommodated in the exchange, wherein the call control load is measured, and traffic is measured in accordance with a measuring method corresponding to the thus-measured load.

Accordingly, in the traffic measuring apparatus and the traffic measuring method, traffic measurement can be performed at all times in accordance with an optimal measuring method that is determined or selected in consideration of the call control load. Therefore, detailed traffic measurement can always be performed in a flexible manner, while the load acting on the call control stemming from the traffic measurement is minimized and the call control processing capability of the exchange is utilized maximally.

BRIEF DESCRIPTION OF THE DRAWINGS

FIG. 4 is a table showing traffic measurement items to be measured by the traffic measuring apparatus according to the first embodiment;

FIG. 5 is a block diagram showing the traffic measuring apparatus according to the first embodiment;

DESCRIPTION OF THE PREFERRED EMBODIMENT (a) Description of Aspects of the Present Invention First, aspects of the present invention will be described with reference to the accompanying drawings.

Figure 1:
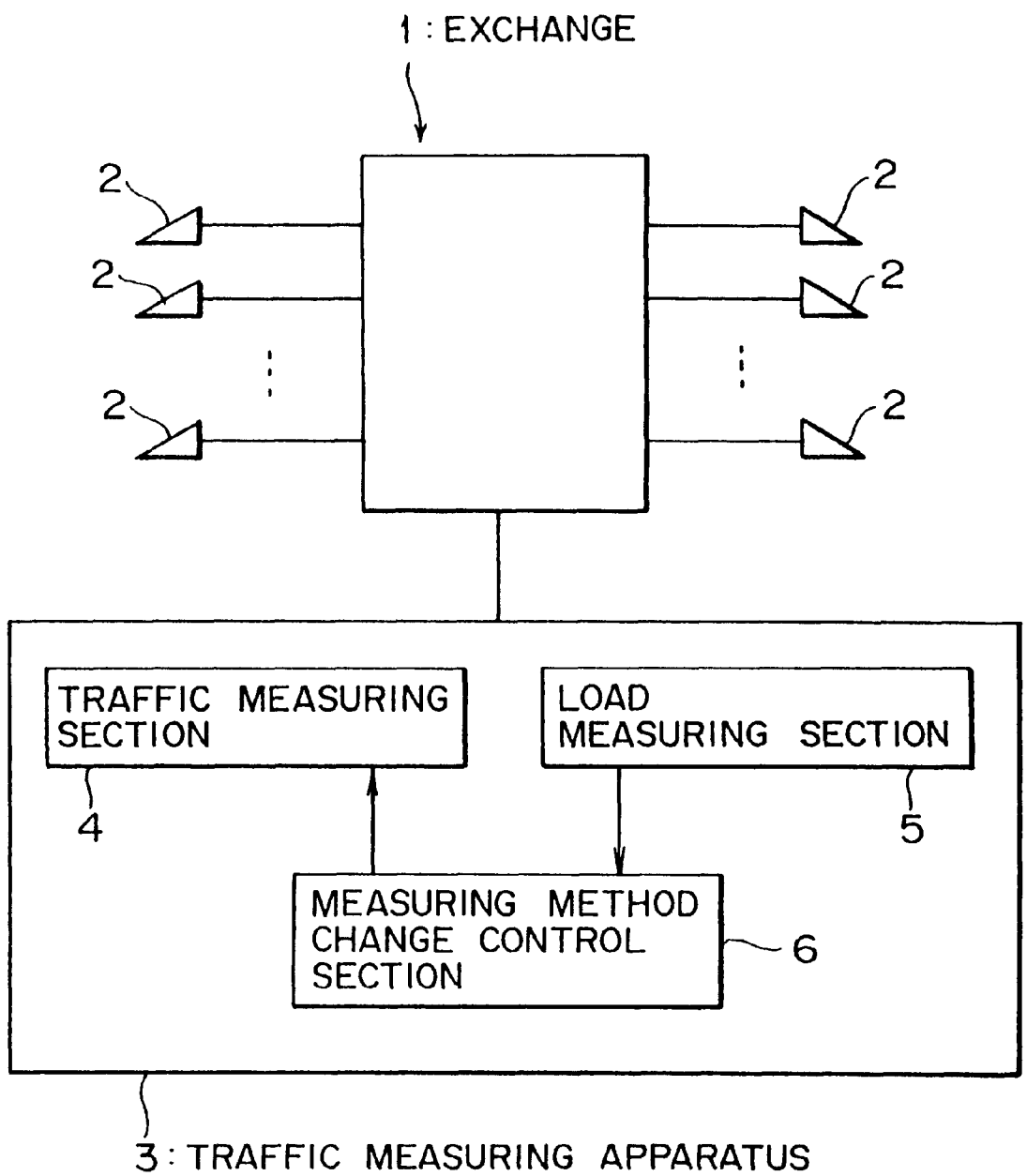
FIGS. 1 and 2 are block diagrams each showing an aspect of the present invention.

FIG. 1 is a block diagram showing an aspect of the present invention. In FIG. 1, numeral 1 denotes an exchange capable of accommodating a plurality of terminals 2, and numeral 3 denotes a traffic measuring apparatus for measuring traffic caused by call control for the terminals 2 accommodated in the exchange 1. In the present invention, as shown in FIG. 1, the traffic measuring apparatus 3 is composed of a traffic measuring section 4, a load measuring section 5, and a measuring method change control section 6.

The traffic measuring section 4 measures the traffic in accordance with a predetermined measuring method. The load measuring section 5 measures the call control load. The measuring method change control section 6 changes the measuring method used in the traffic measuring section 4 to a different measuring method in accordance with the call control load measured by the load measuring section 5.

In the traffic measuring apparatus 3 of the present invention having the above-described structure, since the traffic measuring method used in the traffic measuring section 4 can be changed automatically by the measuring method change control section 6 in accordance with the call control load of the exchange 1, traffic measurement can be performed at all times in accordance with an optimal measuring method that is determined in consideration of the call control load.

Accordingly, detailed traffic measurement can always be performed in a flexible manner, while the load acting on the call control stemming from the traffic measurement is minimized and the call control processing capability of the exchange 1 is utilized maximally.

The traffic measuring section 4 may operate in accordance with a first measuring method in which traffic is measured upon occurrence of each call, or a second measuring method in which traffic is measured at predetermined intervals, and the measuring method change control section 6 may change the measuring method used in the traffic measuring section 4 between the first and second measuring methods in accordance with the call control load measured by the load measuring section 5.

By virtue of the above structure, the traffic measuring apparatus 3 can measure traffic upon occurrence of each call or at constant intervals in accordance with the call control load. Therefore, based on the call control load, the method of traffic measurement can be changed automatically between the first measuring method in which traffic is measured upon occurrence of each call in order to attach importance to securing high reliability of results of traffic measurement and the second measuring method in which traffic is measured at constant intervals independently of the call control in order to attach importance to shortening the traffic measurement period.

Accordingly, the load that the traffic measurement imparts to the call control processing can be minimized at all times.

Specifically, the measuring method change control section 6 may comprise a threshold value setting section for setting a threshold value for the call control load, and a comparing section for comparing the load measured by the load measuring section 5 with the threshold value set by the threshold value setting section. When the comparing section judges that the load is equal to or greater than the threshold value, the measuring method used in the traffic measuring section 4 is set to the second measuring method. When the comparing section judges that the load is less than the threshold value, the measuring method used in the traffic measuring section 4 is set to the first measuring method.

By virtue of the above-described structure, in the traffic measuring apparatus 3, when the load of the call control is equal to or greater than a predetermined level (threshold value), traffic is measured at constant intervals in order to avoid increasing the load imparted to the call control; and when the load of the call control is less than the predetermined level, the call control is judged to have sufficient capacity, and traffic is measured upon occurrence of each call in order to obtain results of measurement having high reliability.

Accordingly, the traffic measurement can always be completed within a predetermined period of time regardless of the call control load.

Since the above-described threshold can be changed arbitrarily from the outside, an optimal value can be set as the threshold value in accordance with the trend in increase/decrease of the load, which value varies with the kind of the exchange and the day and time when the exchange operates. Therefore, this feature greatly contributes to the versatility of the traffic measuring apparatus 3.

The traffic measuring section 4 may have a structure such that traffic is measured in accordance with predetermined measurement items, and the measuring method change control section 6 may have a structure such that the measuring method used in the traffic measuring section 4 can be changed for each measurement item. By virtue of this structure, the traffic measuring apparatus 3 is able to change the measuring method used in the traffic measuring section 4 in accordance with requirements, such as a requirement in which reliable measurement results are always needed for a certain measurement item. Thus, for each measurement item, traffic measurement can be performed in accordance with an optimal measuring method.

Accordingly, more detailed traffic measurement can be performed without being affected by the call control load.

Specifically, the measuring method change control section 6 may have a measuring method setting section for setting a measuring method for each of the measurement items, and the traffic measuring section 4 may have a structure such that the measuring method is changed based on the measuring method set by the measuring method setting section. In this case, for each measurement item, the measuring method can be easily designated in order to change the measuring method. This feature greatly facilitates the designation of a desired measuring method for each measurement item.

Since the measuring method can be changed arbitrarily from the outside, the measuring method can be set in accordance with a desire of, for example, a maintenance engineer for the exchange 1. This feature also contributes the versatility of the traffic measuring apparatus 3.

Further, the measuring method change control section 6 may have a structure such that upon reception of an instruction indicating a change of the measuring method, the measuring method change control section 6 performs the above-described processing for changing the measuring method. In this case, since the measuring method used in the traffic measuring section 4 can be changed in accordance with an external instruction, the method of measuring traffic can be forcibly changed from the outside in accordance with the conditions, so that traffic can always be measured in accordance with a desired measuring method.

Moreover, the measuring method change control section 6 may include a confirmation information output section for outputting confirmation information that is used for confirming whether processing of changing the measuring method is permitted, as well as a reception section for receiving a response to the confirmation information, and may operate such that when the reception section does not receive a change request as the response, the measuring method change control section 6 does not perform the processing of changing the measuring method.

By virtue of this feature, in the traffic measuring apparatus 3, when the measuring method used in the traffic measuring section 4 is changed, this change is confirmed by, for example, a maintenance person for the exchange 1. Therefore, the measuring method is never changed against the maintenance person's intention, so that traffic measurement can be performed in accordance with the maintenance engineer's intention. Thus, unnecessary changes of the measuring method can be minimized.

The measuring method change control section 6 may include a change number count section for counting the number of times that the changing processing is performed, and may have a structure such that when the number of times counted by the change number count section becomes equal to or greater than a predetermined number, the change processing is not performed for a predetermined period of time. By virtue of this feature, in the traffic measuring apparatus 3, the measuring method used in the traffic measuring section 4 is prevented from being changed too frequently, which would otherwise occur, for example, when the load of the call control changes greatly and is unstable. Thus, it becomes possible to minimize an increase in the load acting on the exchange 1 stemming from frequent changes of the measuring method.

Moreover, the measuring method change control section 6 may include a time information setting section for setting time information indicating time periods within which the above-described change processing can be performed and may have a structure such that the change processing is performed based on the time information set by the time information setting section. By virtue of this feature, in the traffic measuring apparatus 3, the measuring method used in the traffic measuring section 4 can be changed in accordance with a designated time schedule. Thus, it becomes possible to carry out traffic measurement in accordance with optimal measuring methods corresponding to time zones, thereby enabling traffic measurement to be performed in more detail and flexibly.

When the time information setting section has a structure such that the above-described time information is received from the outside, the time for changing the measuring method and the like can be set and changed arbitrarily from the outside. This feature also contributes to the versatility of the traffic measuring apparatus 3.

Figure 2:
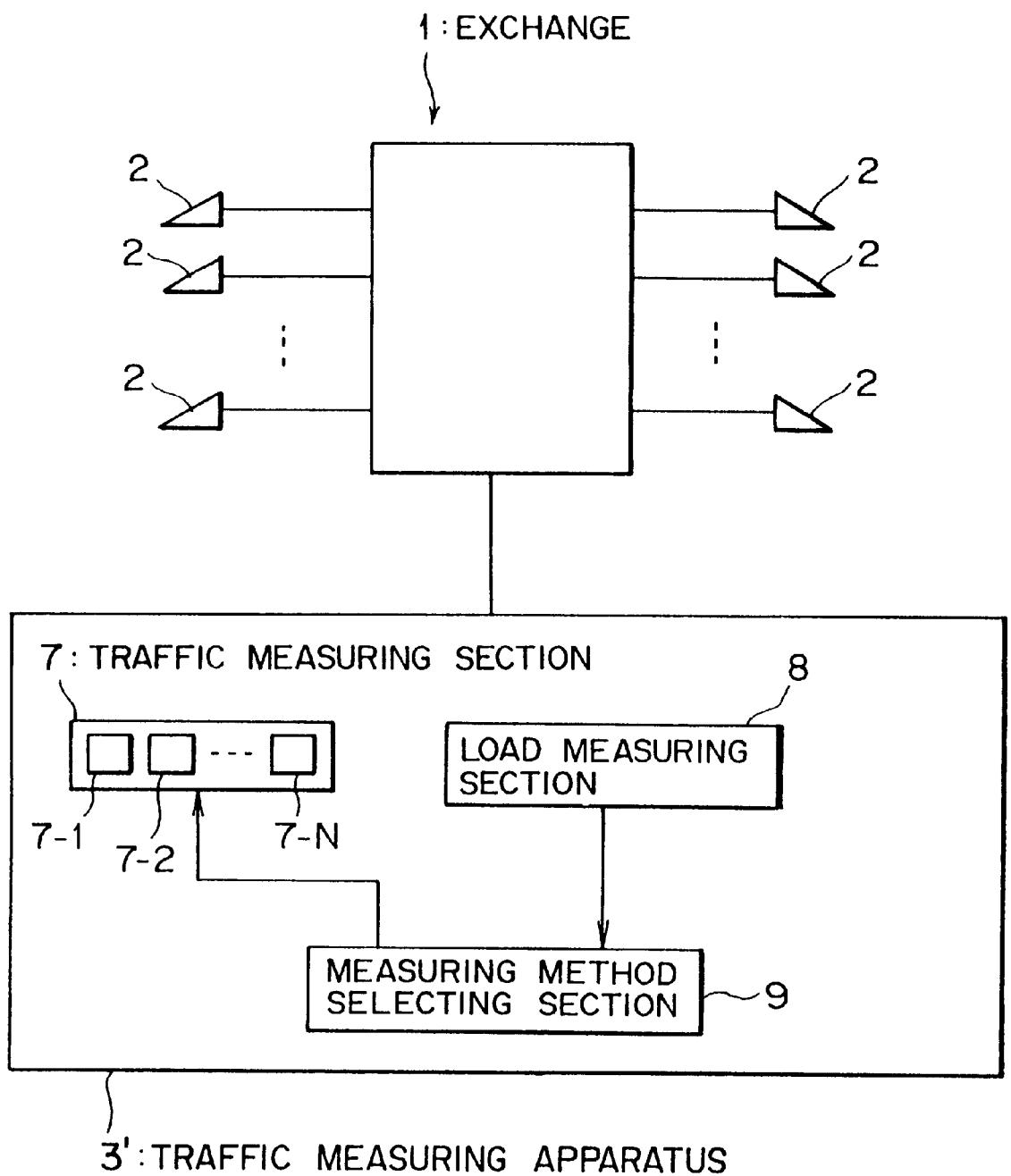

FIG. 2 is a block diagram showing another aspect of the present invention. In FIG. 2, numeral 1 denotes an exchange capable of accommodating a plurality of terminals 2, and numeral 3' denotes a traffic measuring apparatus for measuring traffic caused by call control for the terminals 2 accommodated in the exchange 1. The traffic measuring apparatus 3' shown in FIG. 2 is composed of a traffic measuring section 7, a load measuring section 8, and a measuring method selecting section 9.

The traffic measuring section 7 measures the traffic in accordance with a plurality of measuring methods 7-1 to 7-N (where N is a natural number equal to or greater than 2). The load measuring section 8 measures the call control load. In accordance with the call control load measured by the load measuring section 8, the measuring method selecting section 9 selects one of the measuring methods 7-$i$ (where i is a number between 1 and N) for use in the traffic measuring section 7.

In the traffic measuring apparatus 3 of the present invention having the above-described structure, since a measuring method 7-$i$ to be used in the traffic measuring section 4 is selected automatically in accordance with the call control load of the exchange 1, traffic measurement can be performed at all times in accordance with an optimal measuring method 7-$i$ that is determined in consideration of the call control load. Accordingly, in this case as well, proper traffic measurement can be performed flexibly at all times while minimizing the call control load stemming from the traffic measurement.

That is, the traffic measuring apparatuses 3 and 3' of the present invention, which have been described with reference to FIGS. 1 and 2, have means for measuring traffic in accordance with a measuring method that corresponds to the load of the call control in the exchange 1. Therefore, the traffic measuring apparatuses 3 and 3' can measure the call control load and measure the traffic in accordance with a measuring method corresponding to the measured load.

Accordingly, detailed traffic measurement can always be performed in a flexible manner, while the load acting on the call control stemming from the traffic measurement is minimized and the call control processing capability of the exchange 1 is utilized maximally.

(b) Description of Embodiments of the Present Invention

Figure 3:
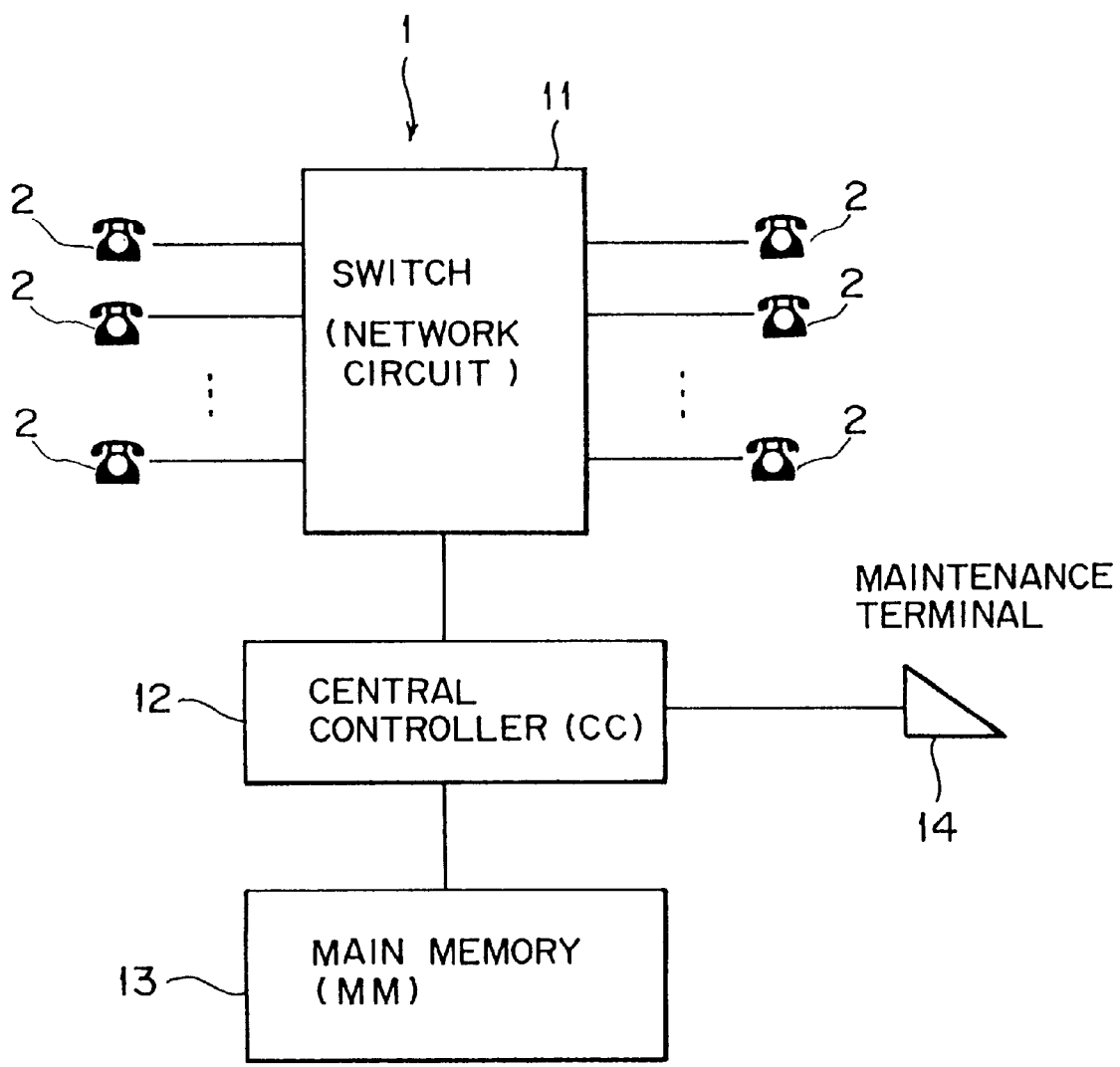
FIG. 3 is a block diagram showing the structure of an exchange to which is applied a traffic measuring apparatus according to a first embodiment of the present invention.
Figure 6:
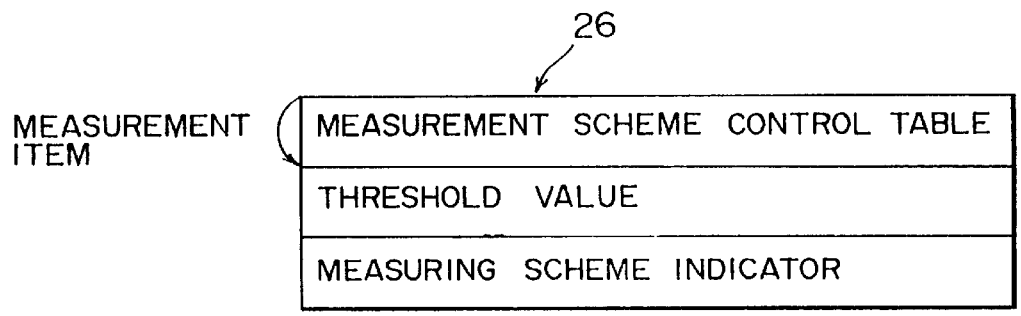
FIG. 6 is a diagram showing an example of a measuring scheme control table used in the traffic measuring apparatus according to the first embodiment.

With reference to the accompanying drawings, embodiments of the present invention will be described.
(b-1) First embodiment FIG. 3 is a block diagram showing the structure of an exchange to which is applied a traffic measuring apparatus according to a first embodiment of the present invention. As shown in FIG. 3, an exchange 1 according to the present embodiment is composed of a switch (network circuit) 11, a central controller (CC) 12, and a main memory (MM) 13. The switch 11 accommodates a plurality of telephone terminals (hereinafter referred to as "terminals") 2. The central controller (CC) 12 generally controls setting and releasing of a call path between the terminals 2 performed by the switch 11. The main memory (MM) 13 stores therein a control program that the central controller 12 requires to operate, as well as call information obtained through call control of the central controller 12.

Whenever call control is performed for a call between the terminals 2, the central controller 12 of the present embodiment stores into the main memory 13 call information of the corresponding terminal 2. As will be described later, the central controller 12 also selects a call-by-call scheme (a first measuring method) or a sampling scheme (a second measuring method) based on the call control load (the activity ratio of CC) and collects information related to traffic (or measures traffic) caused by the call control, in accordance with the selected scheme with reference to the call information of the main memory 13.

In the present embodiment, various kinds of traffic information (basic traffic, route traffic, subscriber traffic, etc.) are collected (measured) in accordance with the measurement items as shown in FIG. 4.

To this end, as shown in FIG. 5, the central controller 12 of the present embodiment includes a traffic measuring apparatus 15 composed of a traffic measuring section 16, a CC activity ratio measuring section 17, and a measuring scheme (method) change control section 18.

The traffic measuring section 16 performs traffic measurement with reference to the call information stored in the main memory 13. In the present embodiment, as shown in FIG. 5, the measuring scheme change control section 18 starts either a call-by-call measuring section 19 or a sampling measuring section 20, so that traffic measurement is performed in accordance with the call-by-call scheme (in which traffic measurement is performed upon occurrence of each call) or the sampling scheme (in which traffic measurement is performed at constant intervals).

A timer 21 provided in the traffic measuring section 16 shown in FIG. 5 clocks the measurement intervals in the sampling scheme (20-second intervals in the present embodiment) and clocks output intervals for outputting to a maintenance terminal 14 the traffic information collected by the measuring sections 19 and 20 (15-minute intervals in the present embodiment).

The CC activity ratio measuring section (load measuring section) 17 measures the activity ratio of the central controller 12 (the state of load stemming from call 20 control processing). In the present embodiment, the CC activity ratio is calculated based on the basic traffic information. The measuring scheme change control section (measuring method selecting section) 18 switches the traffic measuring method used in the traffic measuring section 16 between the call-by-call scheme and the sampling scheme in accordance with the CC activity ratio measured by the CC activity ratio measuring section 17.

To this end, as shown in FIG. 5, the measuring scheme change control section 18 includes a threshold setting section 22, a CC activity ratio/threshold value comparing section 23, a measuring scheme setting section 24, and a measuring scheme start section 25.

Figure 10:
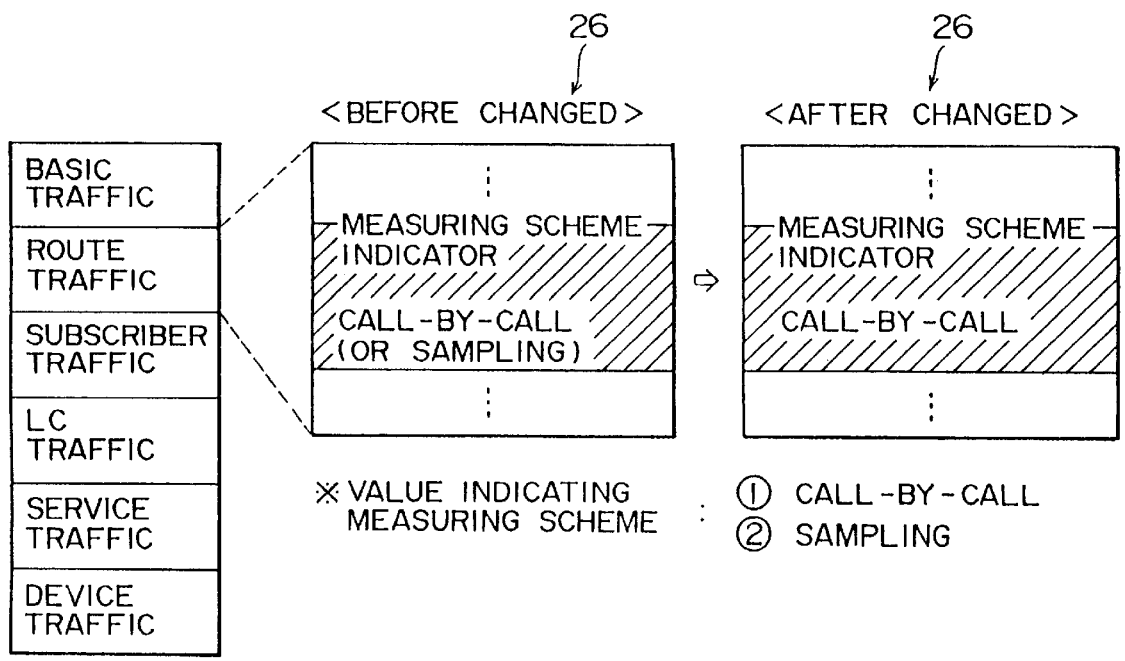

The threshold setting section 22 is used to set a threshold value for the CC activity ratio. In the present embodiment, a threshold value that has been input in advance through the maintenance terminal 14 is received and stored into a corresponding area of a measuring scheme control table 26 that is created in the main memory 13 for each of the above-described measurement items. As shown in FIG. 10, the threshold value is set to a value between 0 to 100% and can be changed freely from the maintenance terminal 14.

Figure 7:
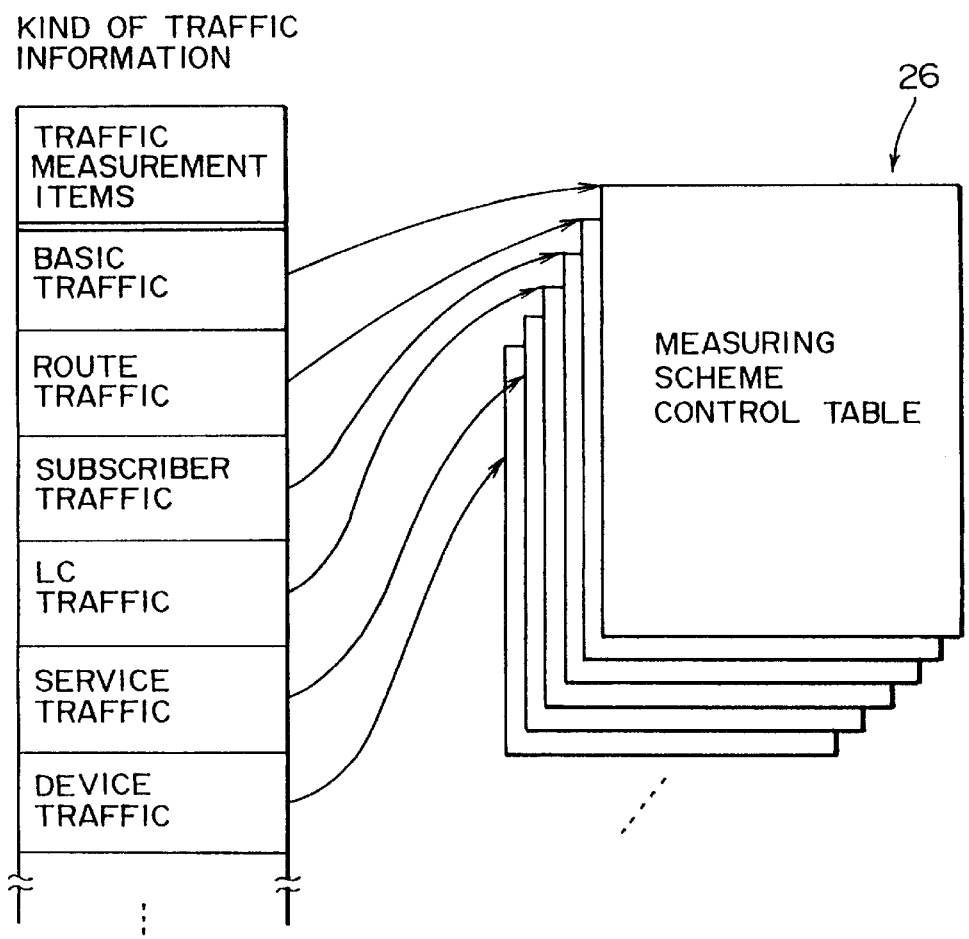
FIG. 7 is a diagram showing an example of a measuring scheme control table used in the traffic measuring apparatus according to the first embodiment.

The CC activity ratio/threshold value comparing section 23 compares the CC activity ratio measured by the CC activity ratio measuring section 17 with the threshold value that the threshold setting section 22 has set into the measuring scheme control table 26 as described above. Based on the result of the comparison, as shown in FIG. 7, the measuring scheme setting section 24 sets the "call-by-call scheme (indicator, e.g., logic value: 1)" or the "sampling scheme (indicator, e.g., logic value: 2)" into the corresponding area of the measuring scheme control table 26 as a measuring scheme. In the present embodiment, when the CC activity ratio is equal to or greater than the threshold value, the "sampling scheme" is set, and when the CC activity ratio is less than the threshold value, the "call-by-call scheme" is set.

The measuring scheme start section 25 starts the call-by-call measuring section 19 or the sampling measuring section 20 of the traffic measuring section 16 with reference to the measuring scheme of the measuring scheme control table 26 that is set in the above-described manner. Specifically, when the "call-by-call scheme" is set, the call-by-call measuring section 19 is started, and when the "sampling scheme" is set, the sampling measuring section 20 is started.

That is, in the traffic measuring apparatus 15 of the present embodiment, the traffic measuring section 16, the CC activity ratio measuring section 17, and the measuring scheme change control section 18 constitute means for measuring the traffic of the exchange 1 in accordance with a measuring method corresponding to the call control load, and the measuring scheme change control section 18 has a structure such that when the comparing section 23 judges that the CC activity ratio is equal to or greater than a threshold value, the measuring method used in the traffic measuring section 16 is set to the "sampling scheme," and when the comparing section 23 judges that the CC activity ratio is less than the threshold value, the measuring method used in the traffic measuring section 16 is set to the "call-by-call scheme."

The operation of the traffic measuring apparatus 15 of the present embodiment having the above-described structure will be described with reference to the flowcharts shown in FIGS. 8(a) and 8(b) (steps A1–A9).

First, there is assumed an initial state in which the traffic measuring apparatus 15 performs traffic measuring processing upon occurrence of each call through use of the call-by-call measuring section 19 of the traffic measuring section 16 and outputs the measured traffic information to the maintenance terminal 14 every 15 minutes.

Figure 8A:
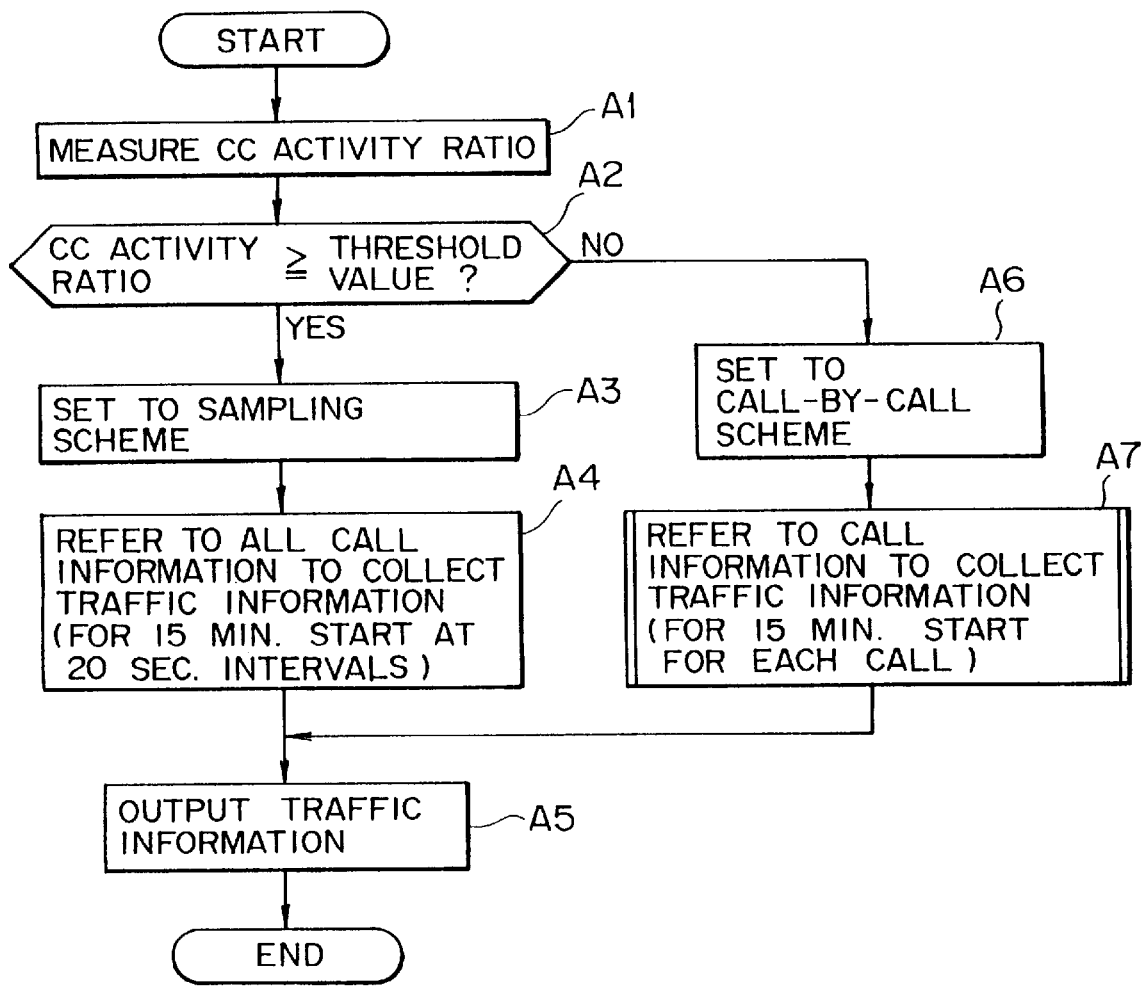
FIGS. 8(a) and 8(b) are flowcharts showing operation of the traffic measuring apparatus according to the first embodiment.
Figure 8B:
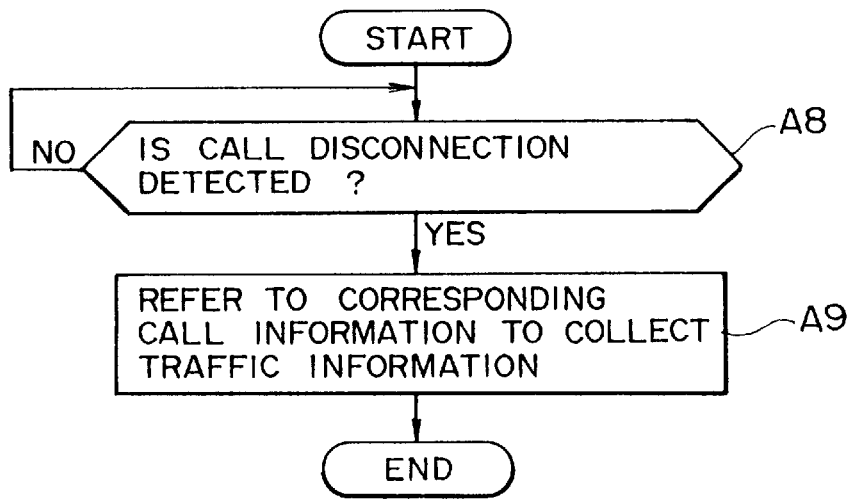

In this state, as shown in FIG. 8(a), the traffic measuring apparatus 15 measures the activity ratio of the central controller 12 through use of the CC activity ratio measuring section 17 (step A1). Subsequently, through use of the comparing section 23 of the measuring scheme change control section 18, the traffic measuring apparatus 15 compares the measured CC activity ratio with the threshold value set into the measuring scheme control table 26 of the main memory 13 (step A2).

Figure 9:
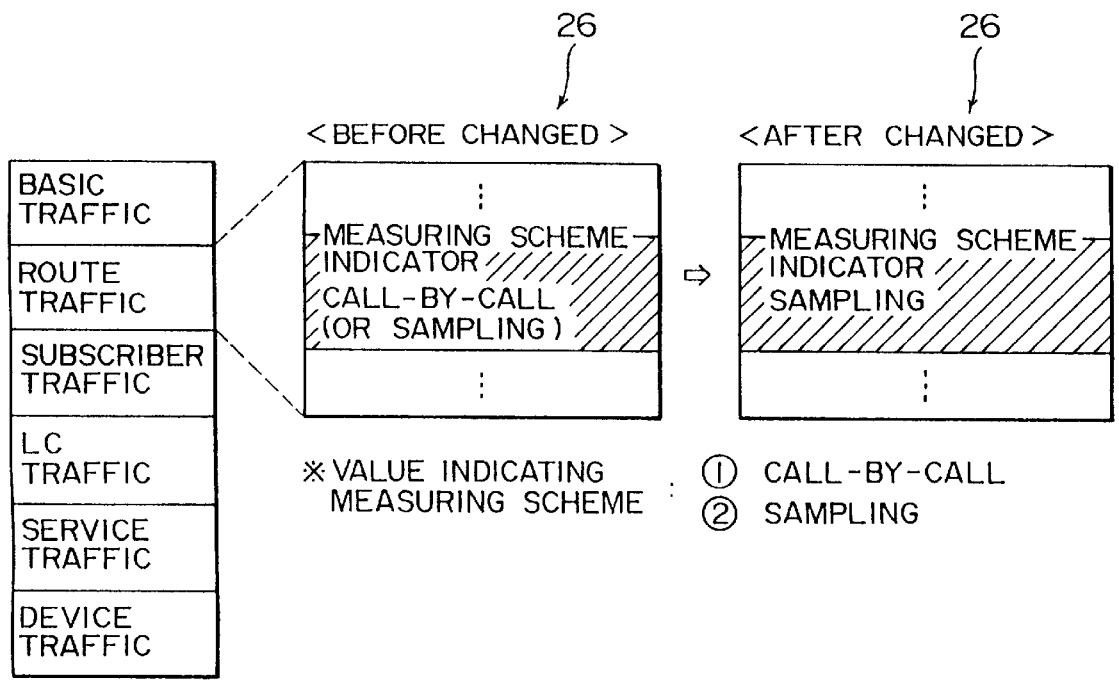
FIGS. 9 to 11 are diagrams showing the operation of the traffic measuring apparatus according to the first embodiment.

When it is judged that the CC activity ratio is equal to or greater than the threshold value (the result of judgment in step A2 is YES), as shown in, for example, FIG. 9, the measuring scheme setting section 24 of the measuring scheme change control section 18 sets the "sampling scheme (logic value: 2)" into the measuring scheme control table 26 as a measuring scheme (step A3).

The measuring scheme start section 25 of the measuring scheme change control section 18 refers to the measuring scheme in the measuring scheme control table 26 and starts the sampling measuring section 20 of the traffic measuring section 16 while bringing the call-by-call measuring section 19 into a sleep state, thereby changing the measuring scheme used in the traffic measuring section 16 from the "call-by-call scheme" to the "sampling scheme."

Thus, the traffic measuring section 16 collects traffic information though use of the sampling measuring section 20. That is, over a predetermined period of time (15 minutes in the present embodiment), all call information stored in the main memory 13 is referred to at constant intervals (20-second intervals in the present embodiment) without regard to the generation of calls (step A4). Collected traffic information is output to the maintenance terminal 14 (step A5).

When the result of the comparison between the CC activity ratio and the threshold value shows that the CC activity ratio is less than the threshold value (the result of judgment in step A2 is NO), as shown in, for example, FIG. 10, the measuring scheme setting section 24 of the measuring scheme change control section 18 sets the "call-by-call scheme (e.g., logic value: 1)" into the measuring scheme control table 26 as a measuring scheme (step A6). As a result, measurement by the call-by-call measuring section 19 is continued (step A7).

In this case, the traffic measuring section 16 collects traffic information through use of the call-by-call measuring section 19. That is, over a period of 15 minutes, whenever the central controller 12 performs call control processing, information related to the corresponding call stored in the main memory 13 is referred to in order to collect traffic information (step A7). Specifically, as shown in FIG. 8(b), the measuring scheme start section 25 monitors the call processing of the central controller 12 in order to detect disconnection of a call (NO route from step A8). When disconnection of a call is detected, the call-by-call measuring section 19 is started in order to collect traffic information while referring to information on the corresponding call stored in the main memory 13 (YES route from step A8 to step A9).

Subsequently, as shown in FIG. 8(a), the traffic information collected by the call-by-call measuring section 19 is output to the maintenance terminal 14 (step A5).

When the traffic measuring apparatus 15 is started again in a next cycle by the central control apparatus 12, the traffic measuring apparatus 15 again measures the CC activity ratio through use of the CC activity ratio measuring section 17 (step A1), and causes the CC activity ratio/threshold value comparing section 23 to compare the CC activity ratio with the threshold value stored in the measuring scheme control table 26 (step A2). If the number of calls has decreased and the CC activity ratio becomes less than the threshold value, the measuring scheme change control section 18 determines that the central controller 12 has sufficient capacity, and causes the measuring scheme setting section 24 to set the "call-by-call scheme" into the "measuring scheme" area of the measuring scheme control table 26 (NO route from step A2 to step A6).

Thus, upon reference to the measuring scheme of the measuring scheme control table 26, the measuring scheme starting section 25 of the measuring scheme change control section 18 starts the call-by-call measuring section 19 of the traffic measuring section 16 in order to change the measuring method used in the traffic measuring section 16 from the "sampling scheme" to the "call-by-call scheme." As a result, over a predetermined period of time (15 minutes in the present embodiment), upon generation of a call the traffic measuring section 16 causes the call-by-call measuring section 19 to refer to the call information in the main memory 13 and to collect traffic information (step A7). Collected traffic information is output to the maintenance terminal 14 (step A5).

If the CC activity ratio becomes less than the threshold value, the measuring scheme change control section 18 sets the "sampling scheme" into the "measuring scheme" area of the measuring scheme control table 26. As a result, the sampling scheme is maintained as the measuring scheme used in the traffic measuring section 16 (YES route from step A2 to steps A3–A5).

Even in the case where the sampling scheme is selected in the initial state, contrary to the above-described case, the measuring scheme used in the traffic measuring section 16 is changed in accordance with the CC activity ratio in the same manner as described above.

As described above, in the traffic measuring apparatus 15 of the first embodiment, traffic measurement can be performed in accordance with the call control load (CC activity ratio) of the exchange 1 (central controller 12) by changing the traffic measuring scheme to either the "call-by-call scheme" (in which importance is attached to reliability and precision of results of measurement) or the "sampling scheme" (in which importance is attached to early completion of measurement during heavy load) in accordance with the CC activity ratio. Therefore, traffic measurement can be performed at all times in accordance with an optimal measuring method that is determined in consideration of the call control load.

Accordingly, detailed traffic measurement can always be performed in a flexible manner, while the load acting on the call control stemming from the traffic measurement (effect of traffic measurement processing on the call control processing) is minimized, thereby effectively preventing an increase in the loss probability, and the call control processing capability of the exchange 1 is utilized maximally. Also, since the load acting on the call control stemming from the traffic measurement can be reduced, the amount of processing in the exchange 1 (central controller 12) can be decreased, so that the cost of the exchange 1 can be reduced.

In the present embodiment, when the CC activity ratio becomes equal to or greater than a predetermined level (threshold value), traffic is measured in accordance with the sampling scheme in order to avoid increasing the load imparted to the call control; and when the CC activity ratio becomes less than the predetermined level, it is judged that the call control has sufficient capacity, and traffic is measured in accordance with the call-by-call scheme. Accordingly, the traffic measurement can always be completed within a predetermined period of time (within 15 minutes) regardless of the value of the CC activity ratio.

Figure 11:
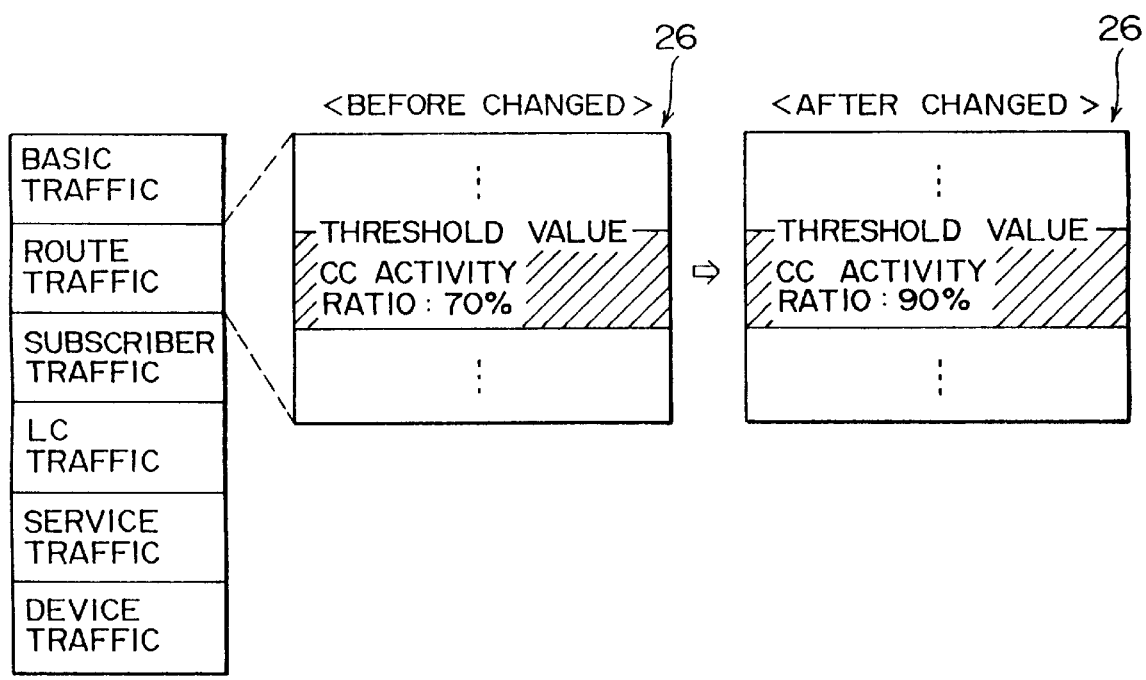

Since the above-described threshold can be changed arbitrarily from the maintenance terminal 14 (see FIG. 11), an optimal value can be set as the threshold value in accordance with the trend of the CC activity ration, which changes depending on the kind of the exchange 1 and the day and time when the exchange operates. This feature greatly contributes to the versatility of the traffic measuring apparatus 15.

(b-2) Second embodiment

Figure 12:
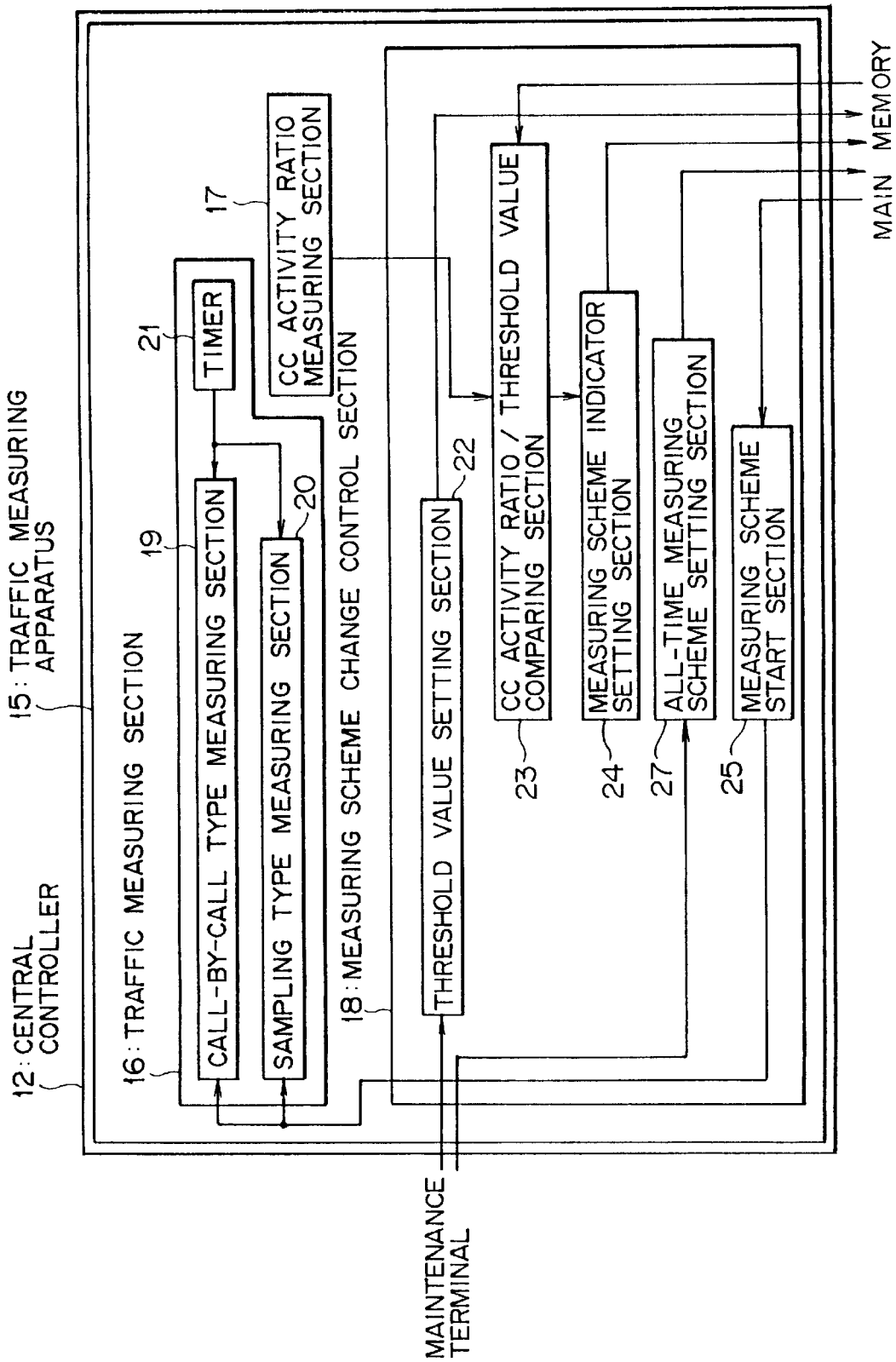
FIG. 12 is a block diagram showing the structure of a traffic measuring apparatus according to a second embodiment of the present invention.

FIG. 12 is a block diagram showing the structure of a traffic measuring apparatus according to a second embodiment of the present invention. The traffic measuring apparatus 15 shown in FIG. 12 differs from that shown in FIG. 5 in that the measuring scheme change control section 18 includes an all-time measuring scheme setting section 27.

Figure 13:
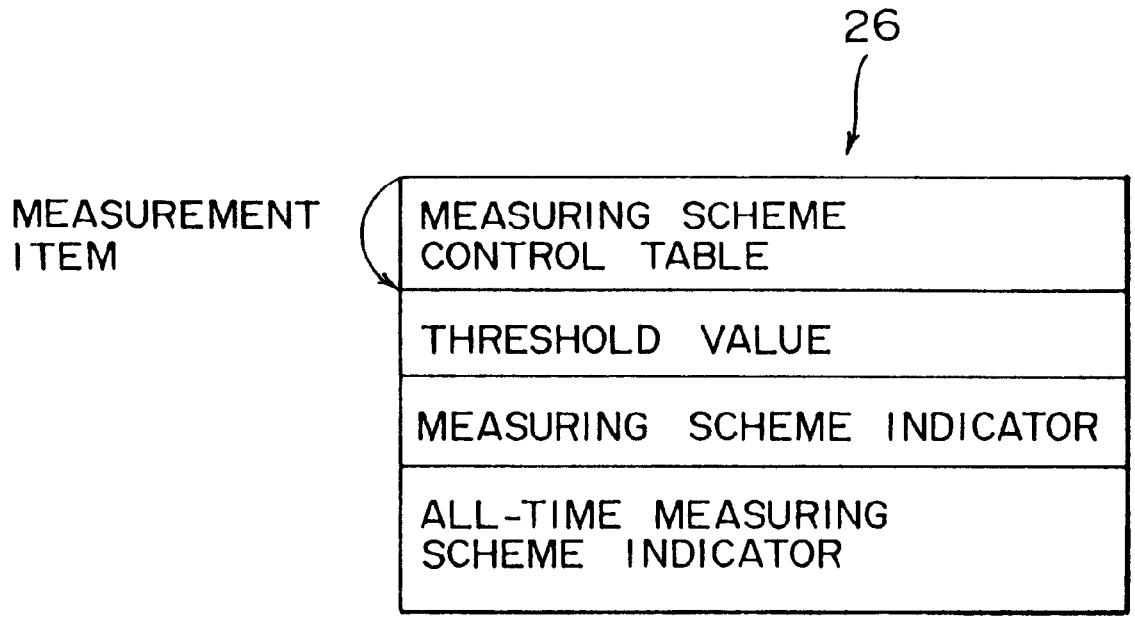
FIG. 13 is a diagram showing an example of a measuring scheme control table used in the traffic measuring apparatus according to the second embodiment.

The all-time measuring scheme setting section measuring method setting section) 27 is used for setting into the measuring scheme control table 26 a measuring scheme to be set at all times, for each of the measurement items (see FIG. 4), which have been described in the first embodiment. In the present embodiment, as shown in FIG. 13, in addition to the "threshold value" and "measuring scheme," one of an "all-time call-by-call scheme (logic value: 1)," an "all-time sampling scheme (logic value: 2)," and a "switching scheme (logic value: 3)" is set as an "all-time measuring scheme" for each of the measurement items.

That is, in addition to the basic operation that has been described in the first embodiment, the measuring scheme change control section 18 can perform switching operation for changing the measuring method used in the traffic measuring section 16 for each of the measurement items, based on the measuring scheme set by the all-time measuring scheme setting section 27. Therefore, the operation can be set such that important measurement items such as basic traffic (CC activity ratio) is always measured in accordance with the call-by-call scheme, which provides reliable and precise results of measurement, and other measurement items are always measured in accordance with the sampling scheme, which does not impart load to the call processing, or in accordance with the automatic switching scheme as described in the first embodiment.

Figure 14:
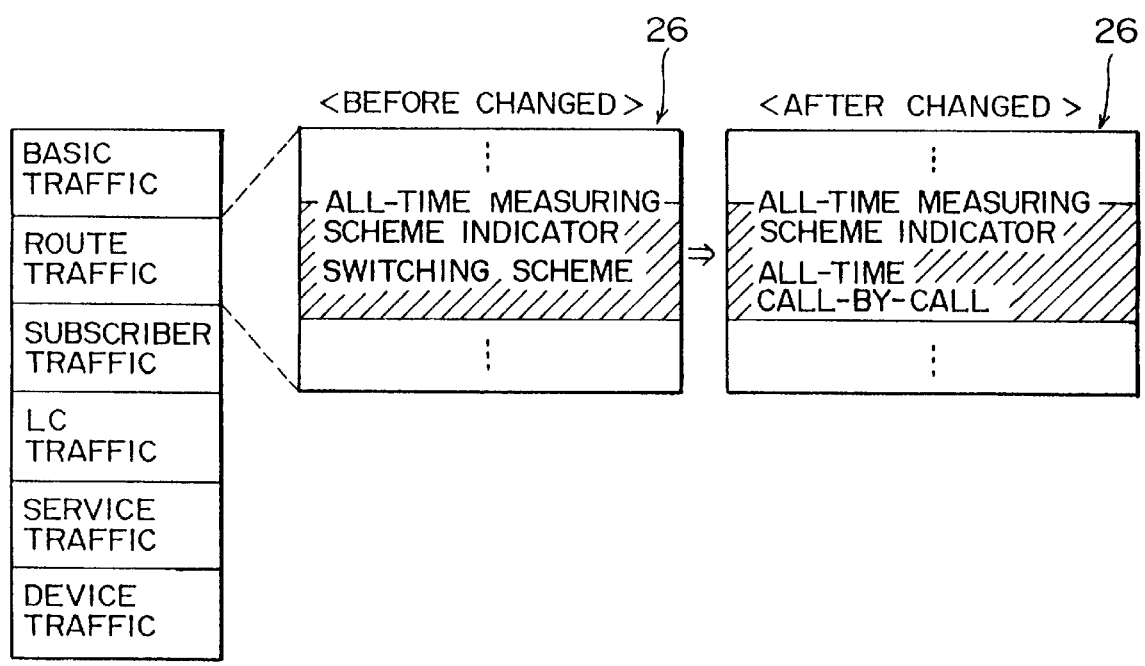
FIG. 14 is a diagram showing the operation of the traffic measuring apparatus according to the second embodiment.

The setting of the "all-time measuring scheme" is performed by the all-time measuring scheme setting section 27, which receives the information (logic value of 1 to 3) that is input from the maintenance terminal 14 in the same manner as that for setting the "threshold value." For example, if the "all-time call-by-call scheme" is input from the maintenance terminal 14 and is stored as the "all-time measuring scheme" for a measurement item (route traffic), for which the "switching scheme" was previously set as the "all-time measuring scheme," as shown in FIG. 14, the "all-time measuring scheme" is changed to the "all-time call-by-call scheme."

Figure 15:
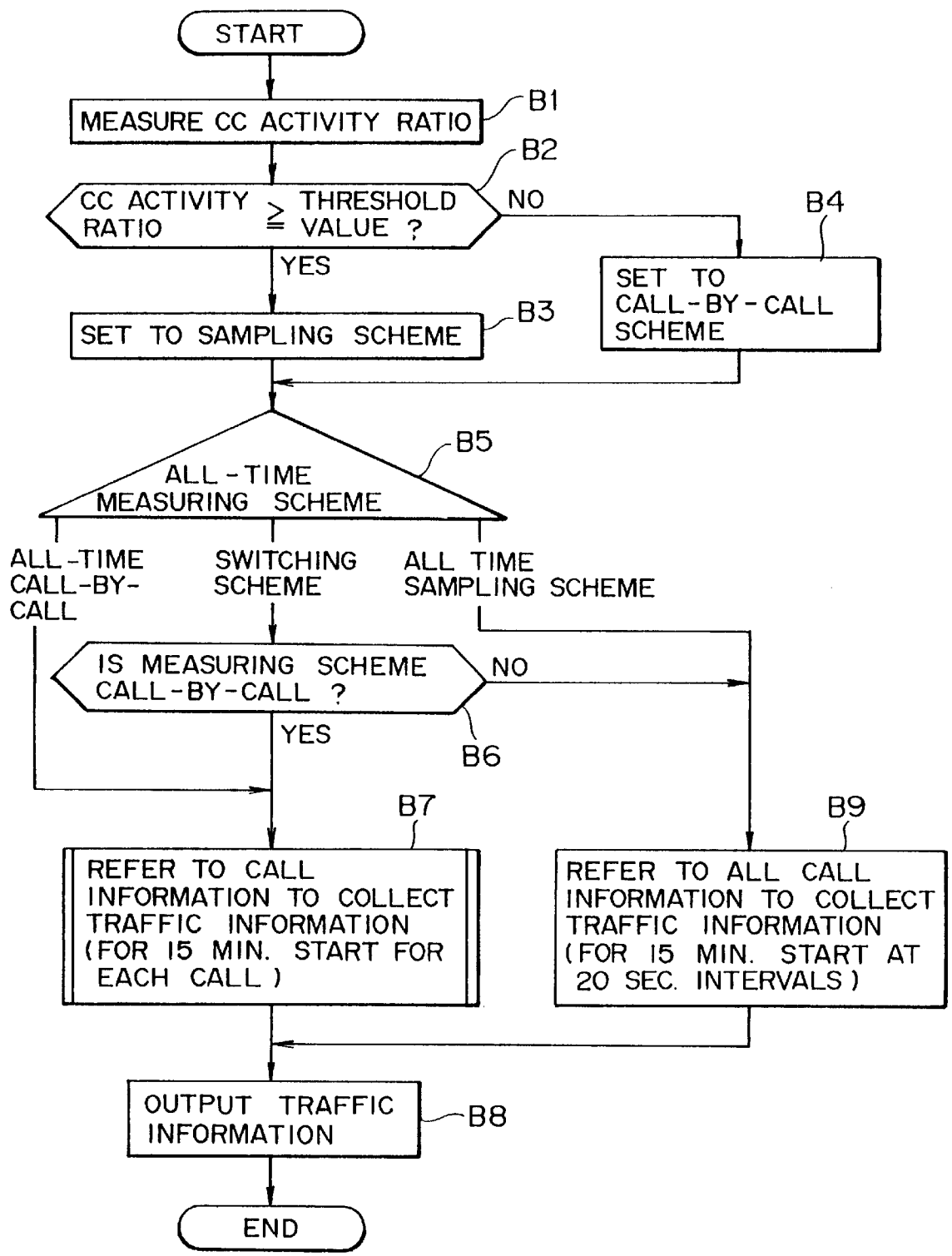
FIG. 15 is a flowchart showing operation of the traffic measuring apparatus according to the second embodiment.

The operation of the traffic measuring apparatus 15 of the second embodiment having the above-described structure will be described with reference to the flowchart shown in FIG. 15 (steps B1–B9).

When the traffic measuring apparatus 15 is started by the central controller 12, the traffic measuring apparatus 15 measures the CC activity ratio through use of the CC activity ratio measuring section 17 (step B1). Subsequently, the traffic measuring apparatus 15 compares the measured CC activity ratio with the threshold value set into the measuring scheme control table 26 of the main memory 13 through use of the CC activity ratio/threshold value comparing section 23 of the measuring scheme change control section 18 (step B2).

Figure 16:
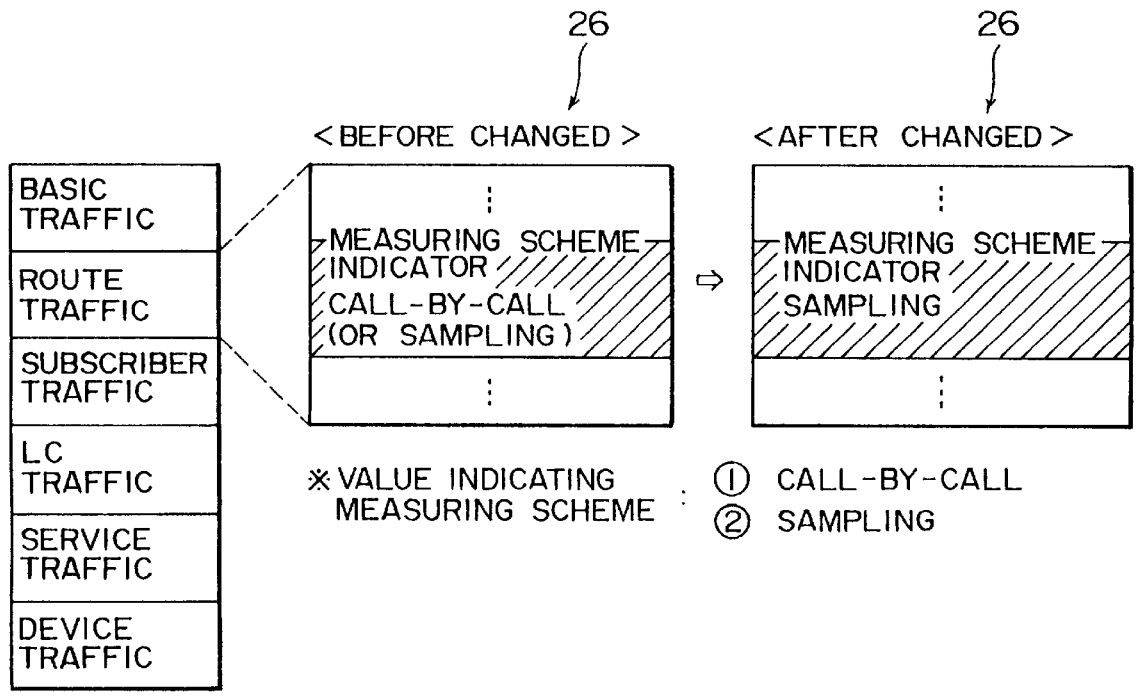
FIG. 16 is a diagram showing the operation of the traffic measuring apparatus according to the second embodiment.

When it is judged that the CC activity ratio is equal to or greater than the threshold value (the result of judgment in step B2 is YES), as shown in, for example, FIG. 16, the measuring scheme setting section 24 of the measuring scheme change control section 18 sets the "sampling scheme (logic value: 2)" into the measuring scheme control tables 26 for all the measurement items in the main memory 13, as a "measuring scheme" (step B3).

Figure 17:
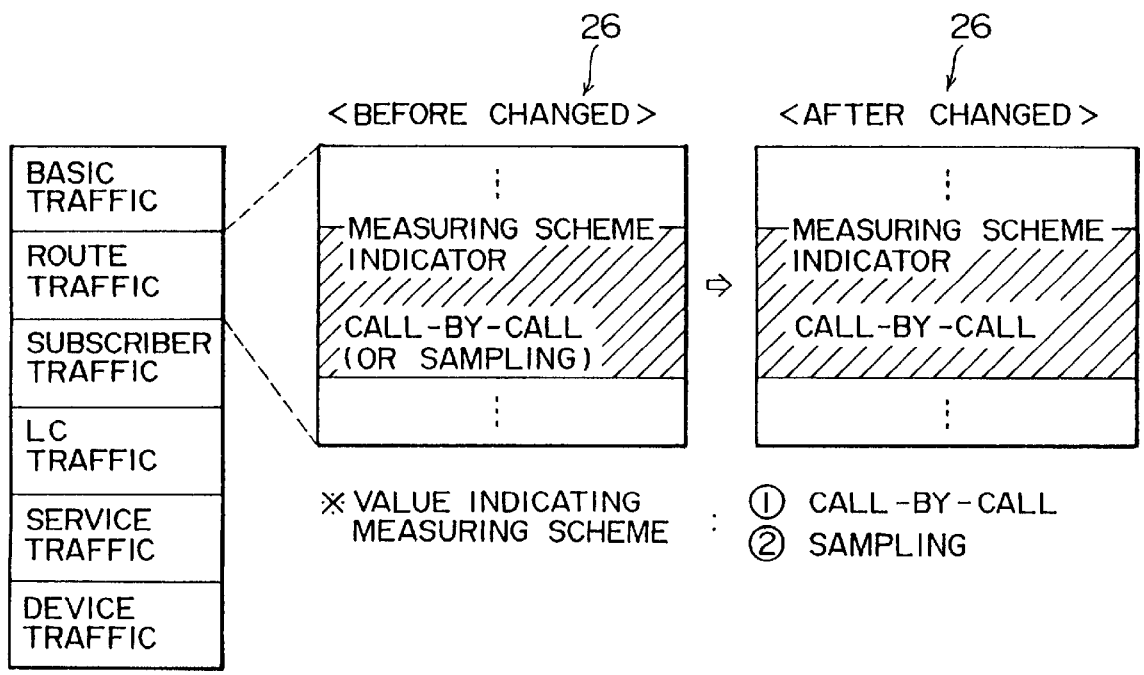
FIG. 17 is a diagram showing the operation of the traffic measuring apparatus according to the second embodiment.

When the CC activity ratio is less than the threshold value (the result of judgment in step B2 is NO), as shown in, for example, FIG. 17, the measuring scheme setting section 24 of the measuring scheme change control section 18 sets the "call-by-call scheme (logic value: 1)" into the measuring scheme control tables 26 for all the measurement items in the main memory 13, as the measuring scheme" (step B4).

Subsequently, with reference to the measuring scheme control tables 26, the measuring scheme start section 25 of the measuring scheme change control section 18 identifies, for each measurement item, which one of the "all-time call-by-call scheme," "all-time sampling scheme," and "switching scheme," is set as the "all-time measuring scheme" (step B5).

If there exists a measurement item for which the "all-time call-by-call scheme" is set as the "all-time measuring scheme," the measuring scheme start section 25 starts the call-by-call measuring section 19 of the traffic measuring section 16 to change the measuring scheme used in the traffic measuring section 16 to the "call-by-call scheme" for that measurement item.

As a result of the above-described operation, for a measurement item for which the "all-time call-by-call scheme" is set, the traffic measuring section 16 uses the call-by-call measuring section 19 in order to collect traffic information. That is, over a period of 15 minutes, whenever the central controller 12 performs call control processing, information related to the corresponding call stored in the main memory 13 is referred to in order to collect traffic information (step B7). Collected traffic information is output to the maintenance terminal 14 (step B8). The detail processing procedure in step B7 is the same as that shown in FIG. 8(b).

If there exists a measurement item for which the "all-time sampling scheme" is set as the "all-time measuring scheme," the measuring scheme start section 25 starts the sampling measuring section 20 of the traffic measuring section 16 to change the measuring scheme used in the traffic measuring section 16 to the "sampling scheme" for that measurement item.

As a result of the above-described operation, for a measurement item for which the "all-time sampling scheme" is set, the traffic measuring section 16 uses the sampling measuring section 20 in order to collect traffic information. That is, over a period of 15 minutes, all call information stored in the main memory 13 is referred to at 20-second intervals in order to collect traffic information (step B9). Collected traffic information is output to the maintenance terminal 14 (step B8).

For a measurement item for which the "switching scheme" is set, the measuring scheme start section 25 further refers to the "measuring scheme" of the corresponding measuring scheme control table 26 in order to judge whether the "call-by-call scheme" or the "sampling scheme" is set (step B6). When the "call-by-call scheme" is set (the result of judgment in step B6 is YES), the call-by-call measuring section 19 is started in order to perform measurement in accordance with the call-by-call scheme in the same manner as described above (steps B7 and B8).

When the "sampling scheme" is set (the result of judgment in step B6 is NO), the sampling measuring section 20 is started in order to perform measurement in accordance with the sampling scheme in the same manner as described above (steps B9 and B8).

As described above, in the traffic measuring apparatus 15 of the second embodiment, it is possible to change the traffic measuring method in accordance with requirements such as a requirement in which reliable measurement results are always needed for a certain measurement item. Thus, for each measurement item, traffic measurement can always be performed in accordance with an optimal measuring method. According, in addition to the same advantages as those descried in the first embodiment, the traffic measuring apparatus 15 of the present embodiment has an advantage that more detailed traffic measurement can be performed without being affected by the CC activity ratio.

In the traffic measuring apparatus 15, since the measuring method can be easily designated for each measurement item through use of the "all-time measuring scheme," a desired measuring method can be designated for each measurement item quite easily. Since the "all-time measuring scheme" can be changed arbitrarily from the outside through use of the maintenance terminal 14, the measuring scheme can be set in accordance with the maintenance person's desire. This feature also contributes the versatility of the traffic measuring apparatus 15 of the present embodiment.

(b-3) Third embodiment

Figure 18:
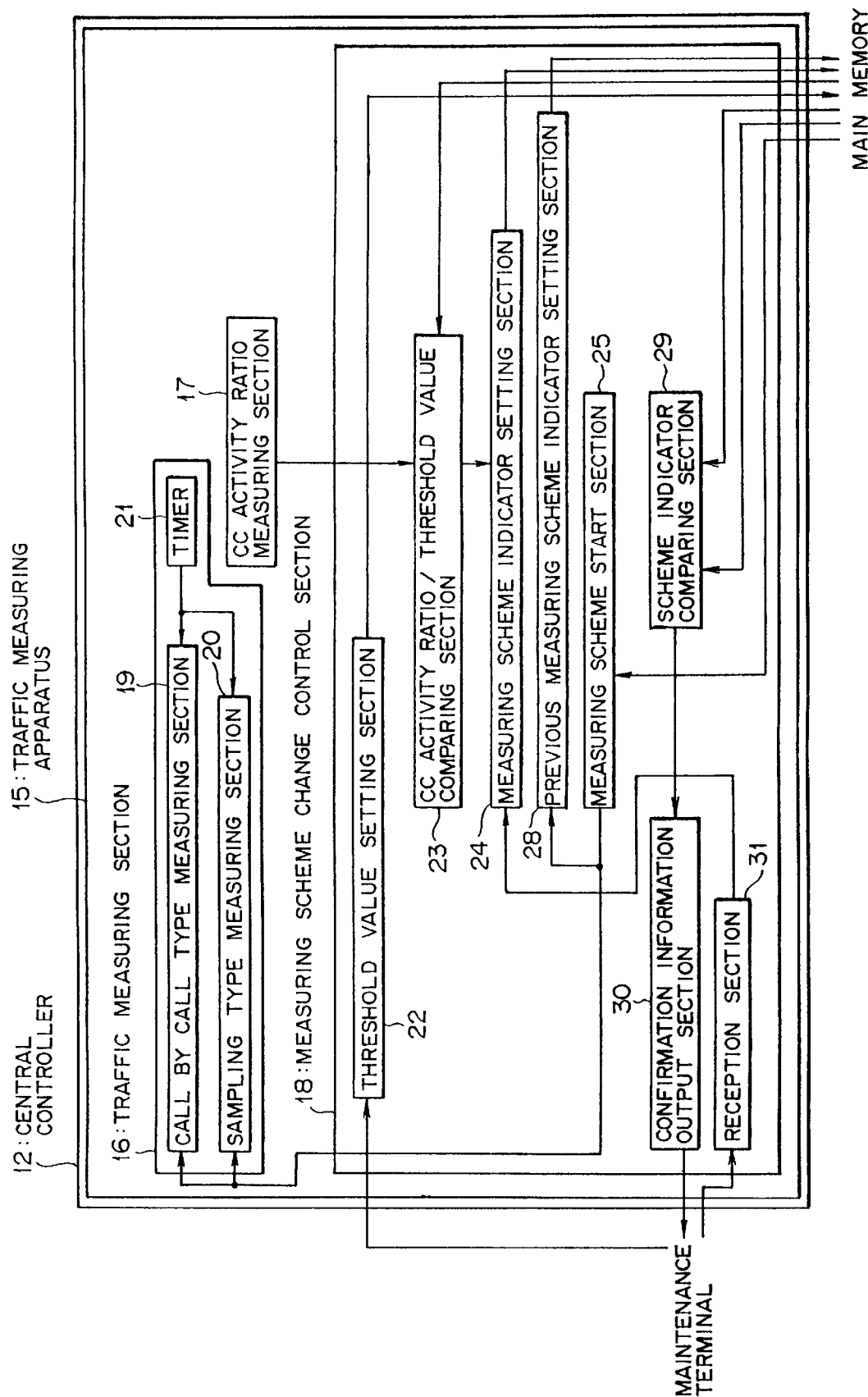
FIG. 18 is a block diagram showing the structure of a traffic measuring apparatus according to a third embodiment of the present invention.

FIG. 18 is a block diagram showing the structure of a traffic measuring apparatus according to a third embodiment of the present invention. The traffic measuring apparatus 15 shown in FIG. 18 differs from that described as the first embodiment (see FIG. 5) in that the measuring scheme change control section 18 includes a previous measuring scheme setting section 28, a scheme comparing section 29, a confirmation information output section 30, and a reception section 31.

Figure 19:
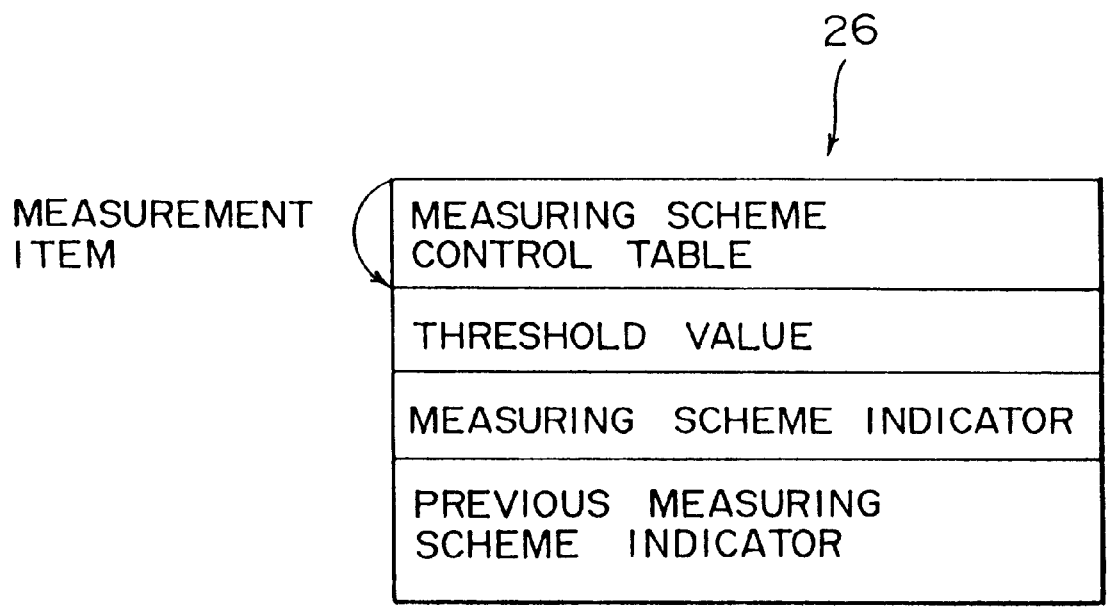
FIG. 19 is a diagram showing an example of a measuring scheme control table used in the traffic measuring apparatus according to the third embodiment.

The previous measuring scheme setting section 28 sets (or records) the measuring scheme (call-by-call scheme, sampling scheme) that was used in the traffic measuring section 16 in the previous cycle whenever the traffic measuring apparatus 15 is started (every 15 minutes). In the present embodiment, the "previous measuring scheme" is set into the measuring scheme control table 26 by the previous measuring scheme setting section 28 together with the "threshold value" and "measuring scheme," as shown in, for example, FIG. 19.

The scheme comparing section 29 compares the "measuring scheme" with the "previous measuring scheme" with reference to the measuring scheme control table 26. When they differ from each other, the confirmation information output section 30 is started. When the confirmation information output section 30 is started by the scheme comparing section 29, the confirmation information output section 30 outputs to the maintenance terminal 14 confirmation information indicating that the traffic measuring scheme is to be changed to a scheme different from the previous measuring scheme. The reception section 31 receives a response from the maintenance terminal 14 after the confirmation information output section 30 outputs the confirmation information. In the present embodiment, when the reception section 31 receives a change request from the maintenance terminal 14 as the response, the reception section 31 starts the measuring scheme start section 25.

Figure 20:
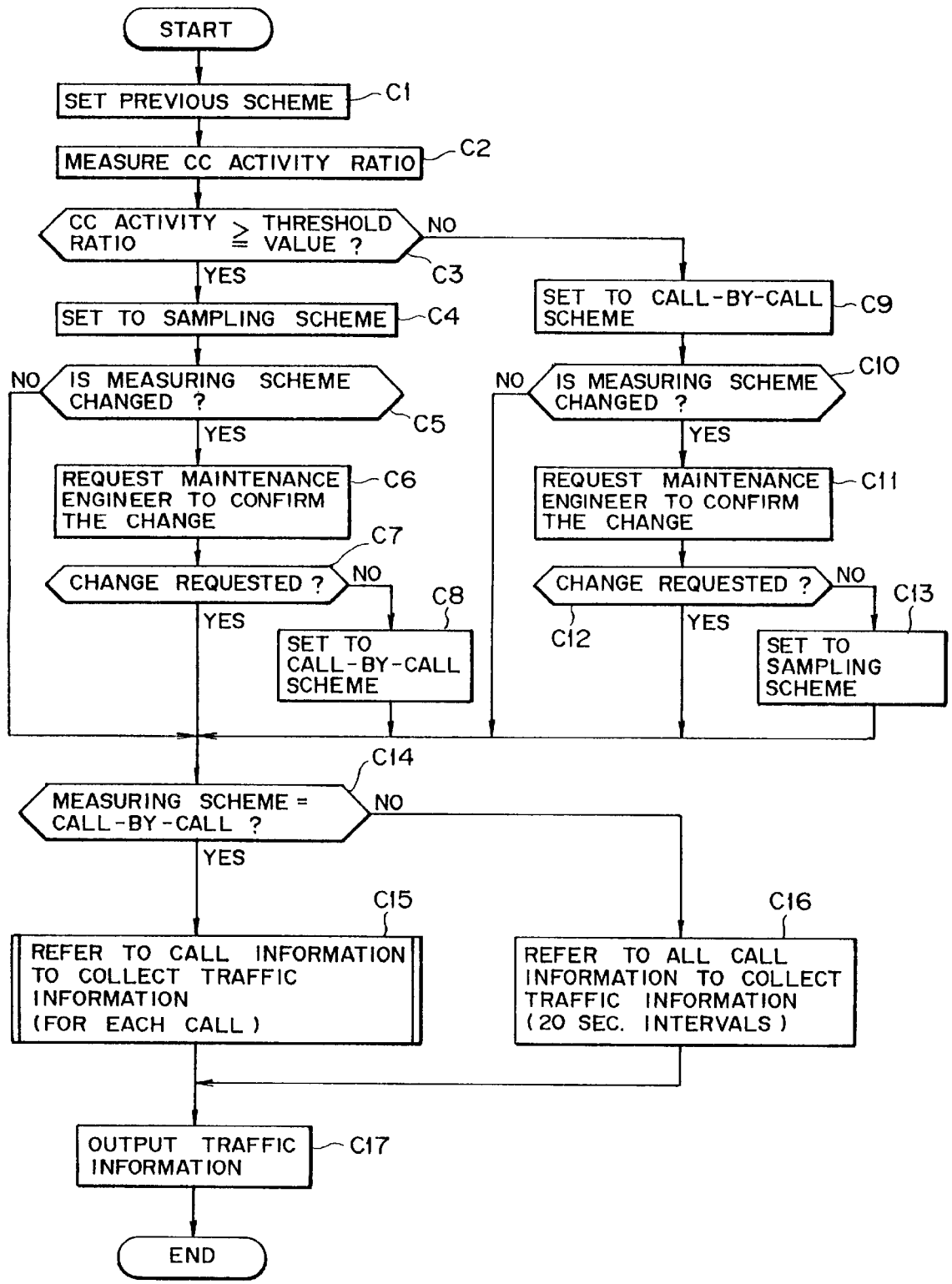
FIG. 20 is a flowchart showing operation of the traffic measuring apparatus according to the third embodiment.

The operation of the traffic measuring apparatus 15 of the third embodiment having the above-described structure will be described with reference to the flowchart shown in FIG. 20 (steps C1–C17).

Figure 21:
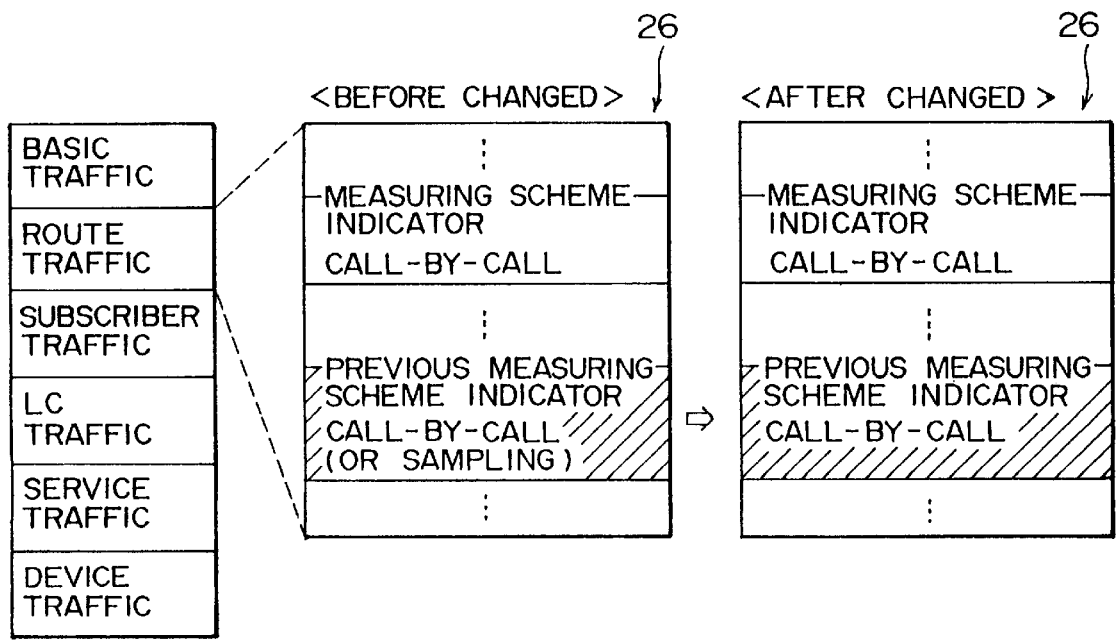
FIGS. 21 to 23 are diagrams each showing the operation of the traffic measuring apparatus according to the third embodiment.

When the traffic measuring apparatus 15 is started by the central controller 12, as shown in FIG. 21, the previous measuring scheme setting section 28 of the measuring scheme change control section 18 sets the measuring scheme (e.g., call-by-call scheme) previously used in the traffic measuring section 16 into the "previous measuring scheme" area of the measuring scheme control table 26 for each measurement items (step C1).

Subsequently, the traffic measuring section 15 measures the CC activity ratio through use of the CC activity ratio measuring section 17 (step C2), and compares the measured CC activity ratio with the threshold value in the measuring scheme control table 26 through use of the CC activity ratio/threshold value comparing section 23 of the measuring scheme change control section 18 (step C3).

Figure 22:
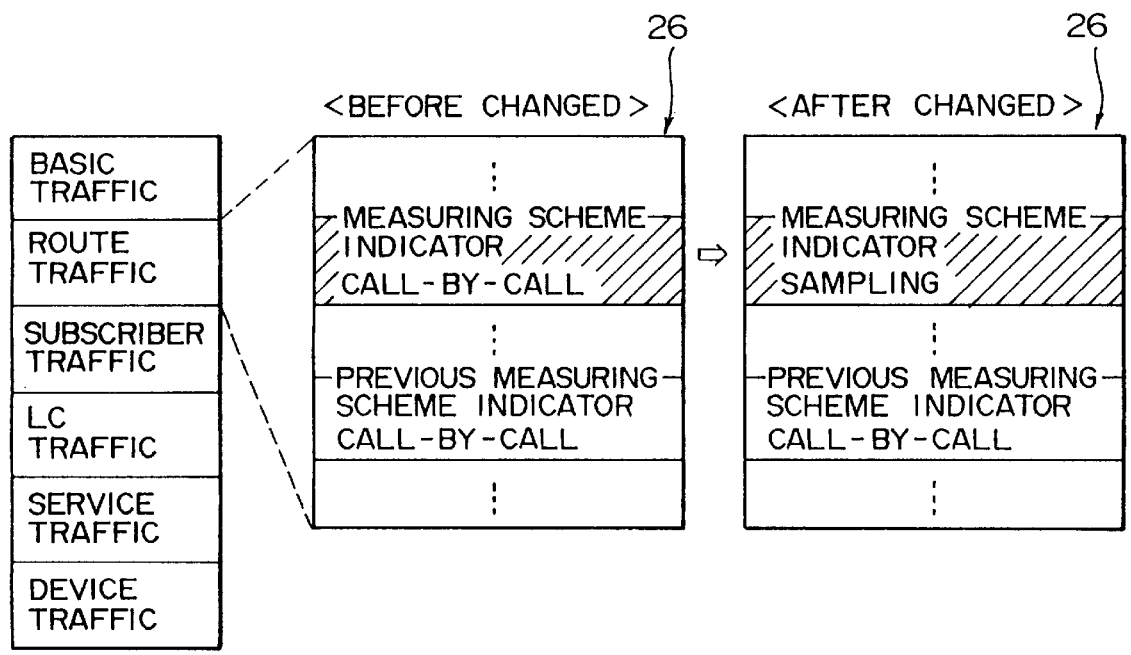

When it is judged that the CC activity ratio is equal to or greater than the threshold value (the result of judgment in step C3 is YES), the CC activity ratio/threshold value comparing section 23 starts the measuring scheme setting section 24 in order to set the "sampling scheme" into the "measuring scheme" area of the corresponding measuring scheme control table 26, as shown in, for example, FIG. 22 (step C4). Subsequently, the scheme comparing section 29 compares the "measuring scheme" with the "previous measuring scheme" with reference to the measuring scheme control table 26 in order to judge whether the "measuring scheme" differs from the "previous measuring scheme" (step C5).

At the present, since the "call-by-call scheme" is set in the "measuring scheme" area and the "sampling scheme" is set in the "sampling scheme" area, the scheme comparing section 29 judges that the measuring scheme has been changed and starts the confirmation output section 30. The confirmation output section 30 then outputs to the maintenance terminal 14 (maintenance person) information indicating the change of the measuring method (YES route from step C5 to step C6). When the "measuring scheme" and the "previous measuring scheme" are the same (in this example, when the "previous measuring scheme" is the "sampling scheme"), no processing is performed (NO route from step C5).

Figure 23:
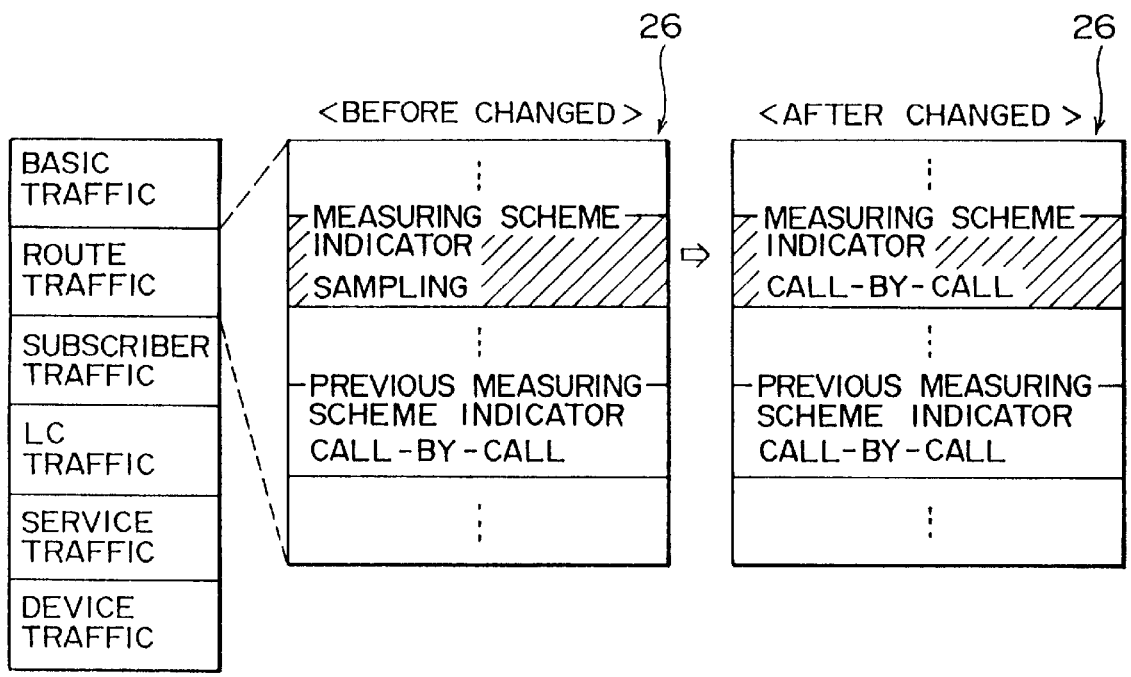

Next, upon reception of the information that indicates the change of the measuring method, the maintenance engineer inputs a "request of change" if he/she permits the change and inputs a "prohibition of change" if he/she does not permit the change. At this time, the measuring scheme change control section 18 is checking whether the reception section 31 has received input information from the maintenance terminal 14 (step C7). When the reception section 31 receives the "prohibition of change" (when the result of judgment in step C7 is NO), the reception section 31 starts the measuring scheme setting section 24 in order to return the "measuring scheme" of the corresponding measuring scheme control table 26 to the original "call-by-call scheme," as shown in FIG. 23. When the reception section 31 receives the "request of change" (when the result of judgment in step C7 is YES), the "sampling scheme" in the "measuring scheme" area is maintained.

When it is judged in step C3 that the CC activity ratio is less than the threshold value (the result of judgment in step C3 is NO), the CC activity ratio/threshold value comparing section 23 starts the measuring scheme setting section 24 in order to set the "call-by-call scheme" into the "measuring scheme" area of the corresponding measuring scheme control table 26 (step C9). Subsequently, the scheme comparing section 29 compares the "measuring scheme" with the "previous measuring scheme" with reference to the measuring scheme control table 26 in order to judge whether the "measuring scheme" differs from the "previous measuring scheme" (step C10).

At the present, since the "call-by-call scheme" is set in both the "previous measuring scheme" area and the "measuring scheme" area, the scheme comparing section 29 does not start the confirmation output section 30 (NO route from step C10). However, when the "previous measuring scheme" and the "measuring scheme" differ from each other (in this example, when the "previous measuring scheme" is the "sampling scheme"), the confirmation information output section 30 is started in order to output to the maintenance terminal 14 (maintenance person) information indicating the change of the measuring method (YES route from step C10 to step C11).

When the reception section 31 receives the "prohibition of change" (when the result of judgment in step C12 is NO), the reception section 31 starts the measuring scheme setting section 24 in order to return the "measuring scheme" of the corresponding measuring scheme control table 26 to the original "sampling scheme" (step C13). When the reception section 31 receives the "request of change" (when the result of judgment in step C12 is YES), the "call-by-call scheme" in the "measuring scheme" area is maintained.

After the above-described confirmation by the maintenance person is completed, the measuring scheme start section 25 of the measuring scheme change control section 18 refers to the "measuring scheme" of the measuring scheme control table 26 (step C14). When the "call-by-call scheme" is set (when the result of judgment in step C14 is YES), the call-by-call measuring section 19 of the traffic measuring section 16 is started in order to perform traffic measurement in accordance with the call-by-call scheme, wherein the call information stored in the main memory 13 is referred to, whenever call control processing is performed (a call is generated), in order to collect traffic information (step C15). The detailed processing procedure in the step C15 is the same as that shown in FIG. 8(*b*).

When the "sampling scheme" is set into the "measuring scheme" area (when the result of judgment in step C14 is NO), the measuring scheme start section 25 starts the sampling measuring section 20 in order to perform traffic measurement in accordance with the sampling scheme, wherein all call information stored in the main memory 13 is referred at 20-second intervals in order to collect traffic information (step C16).

Subsequently, the traffic information collected by the call-by-call scheme or the sampling scheme is output to the maintenance terminal 14 (step C17).

Even in the case where the sampling scheme is set as an initial measuring scheme, processing for obtaining confirmation from the maintenance person is performed in the same manner as described above, when the previous measuring scheme differs from the current measurement scheme.

As described above, in the traffic measuring apparatus of the third embodiment, when the traffic measuring scheme is changed, confirmation of such a change is requested to the maintenance person. Accordingly, in addition to the same advantages as those descried in the first embodiment, the traffic measuring apparatus 15 of the present embodiment has an advantage that the measurement method is never changed against the maintenance person's intention, so that the traffic measurement can be performed in accordance with the maintenance person's intention. Thus, unnecessary changes of the measuring method can be minimized.

(b-4) Fourth embodiment

Figure 24:
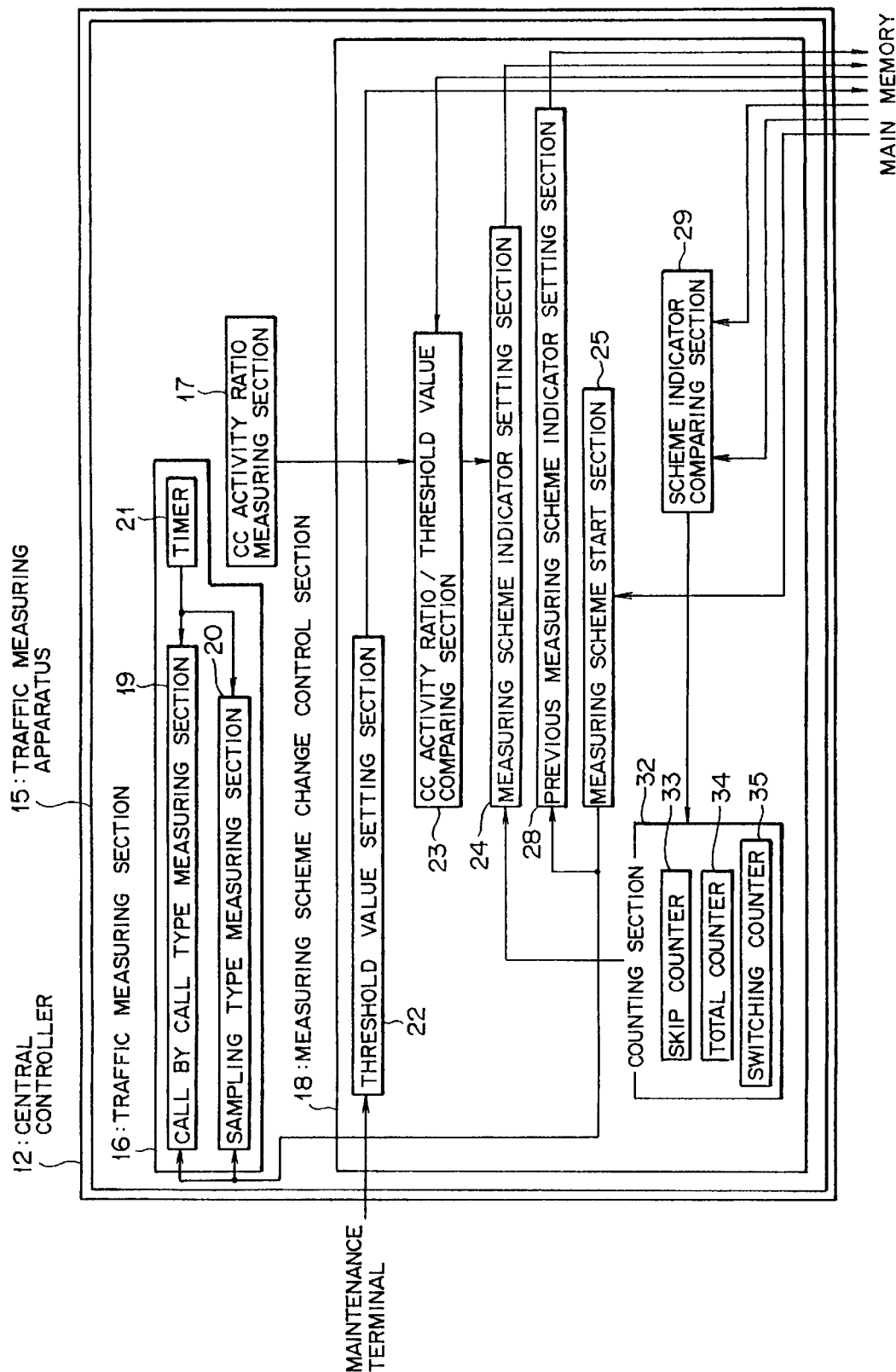
FIG. 24 is a block diagram showing the structure of a traffic measuring apparatus according to a fourth embodiment of the present invention.

FIG. 24 is a block diagram showing the structure of a traffic measuring apparatus according to a fourth embodiment of the present invention. The traffic measuring apparatus 15 shown in FIG. 24 differs from that described as the first embodiment (see FIG. 5) in that the measuring scheme change control section 18 includes a previous measuring scheme setting section 28, a scheme comparing section 29, and a counting section 32. The previous measuring scheme setting section 28 and the scheme comparing section 29 are the same as those described in the third embodiment.

The counting section (change number counting section) 32 monitors the number of times that change control is performed for the traffic measuring section 16 and when the change control is performed more than a predetermined number of times within a predetermined period of time, further change control is restricted for a predetermined period of time. In the present embodiment, when the change control is performed more than the predetermined number of times within the predetermined period of time, the measuring scheme used in the traffic measuring section 16 is set to the sampling scheme unconditionally.

In order to perform the above-described control, the counting section 32 includes a skip counter 33, a total counter 34, and a switching counter 35.

The skip counter 33 is used to set a continuous period in which traffic measurement is performed in accordance with the sampling scheme. In the present embodiment, when the counter value of the switching counter 35 becomes greater than 5, the counter value of the skip counter 33 becomes 10. After that, the counter value of the skip counter 33 is decremented by one whenever traffic information is output to the maintenance terminal 14. The counter value of the skip counter 33 is cleared when the counter value of the switching counter 34 is equal to or less than 5 and the counter value of the total counter 34 is greater than 10.

The total counter 34 is used to monitor the total number of times the traffic measuring processing is started. Whenever the measuring apparatus 15 is started, the counter value of the total counter 34 is incremented. When the counter value of the total counter 34 reaches 10, it is cleared to zero. The counter value of the switching counter 35 is incremented whenever the measuring scheme change control is performed for the traffic measuring section 16.

That is, the counting section 32 of the present embodiment monitors whether the measuring scheme change (switching) control is performed five times or more while the traffic measuring processing is started ten times.

Figure 25:
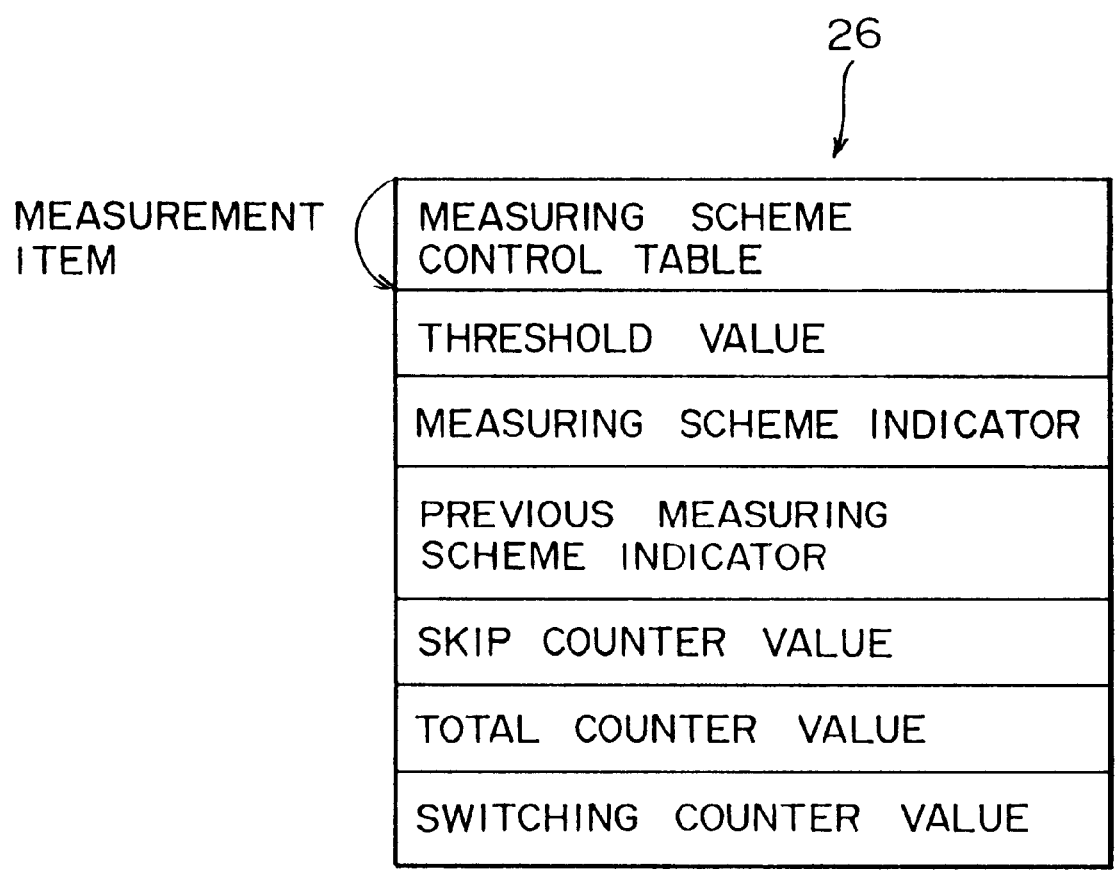
FIG. 25 is a diagram showing an example of a measuring scheme control table used in the traffic measuring apparatus according to the fourth embodiment.

As shown in, for example, FIG. 25, the skip counter value, the total counter value, and the switching counter value are set into the measuring scheme control table 26 together with the above-described "threshold," "measuring scheme," and "previous measuring scheme."

In the present invention, when it is judged that the measuring scheme change (switching) control is performed five times or more while the traffic measuring processing is started ten times, the "sampling scheme" is set into the "measuring scheme" area of the measuring scheme control table 26 by the measuring scheme setting section 24. As a result, traffic measurement is performed in accordance with the sampling scheme until the counter value of the skip counter 33 becomes zero or below zero (i.e., 10 times continuously (15 minutes×10=150 minutes)).

That is, when the value counted by the counting section 32 becomes equal to or greater than a predetermined value (specifically, when the counter value of the switching counter 32 becomes grater than 5), the measuring scheme change processing for the traffic measuring section 16 is stopped for a predetermined period of time (150 minutes).

Figure 26:
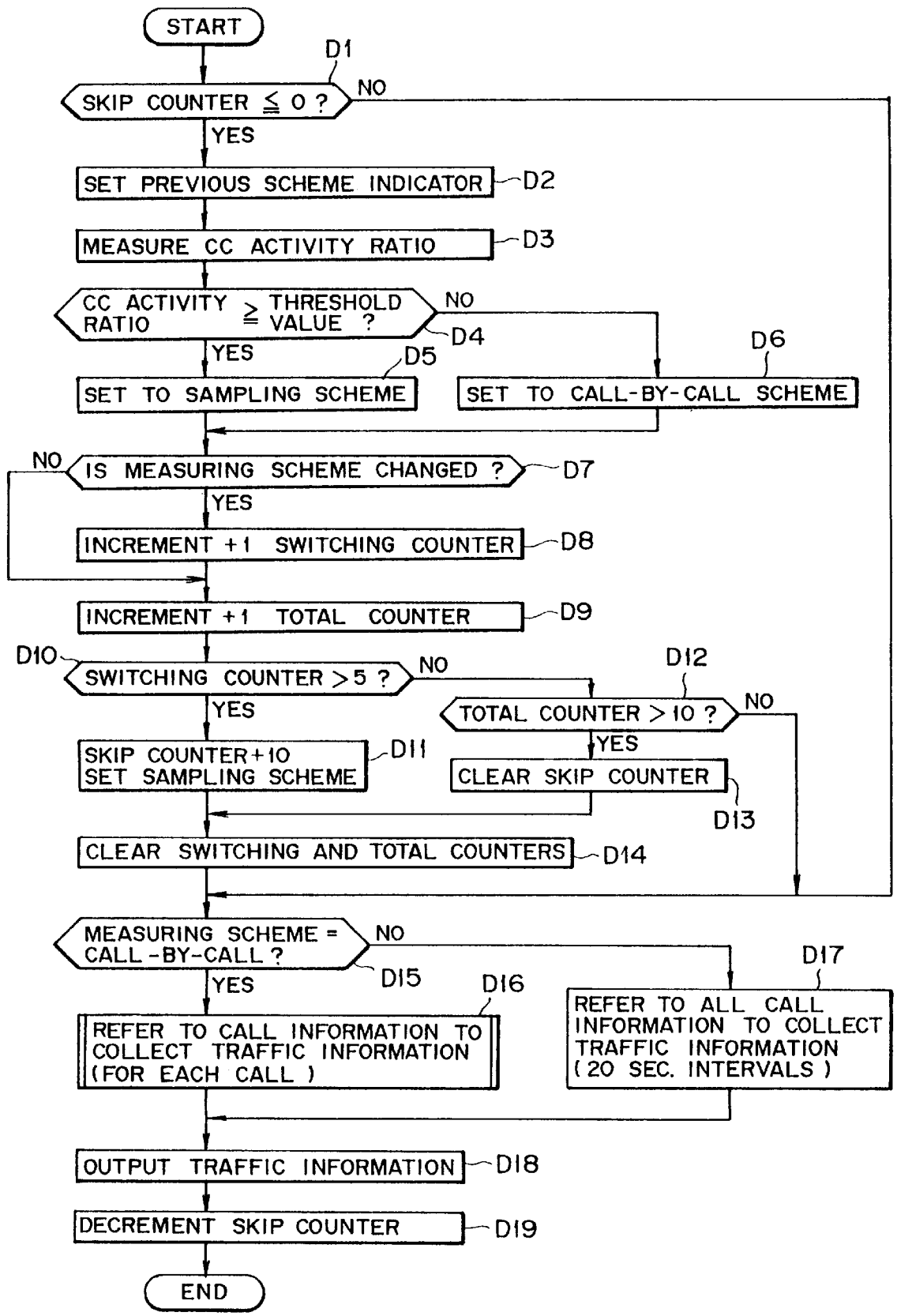
FIG. 26 is a flowchart showing operation of the traffic measuring apparatus according to the fourth embodiment.

The operation of the traffic measuring apparatus 15 of the fourth embodiment having the above-described structure will be described with reference to the flowchart shown in FIG. 26 (steps D1–D19).

Figure 27:
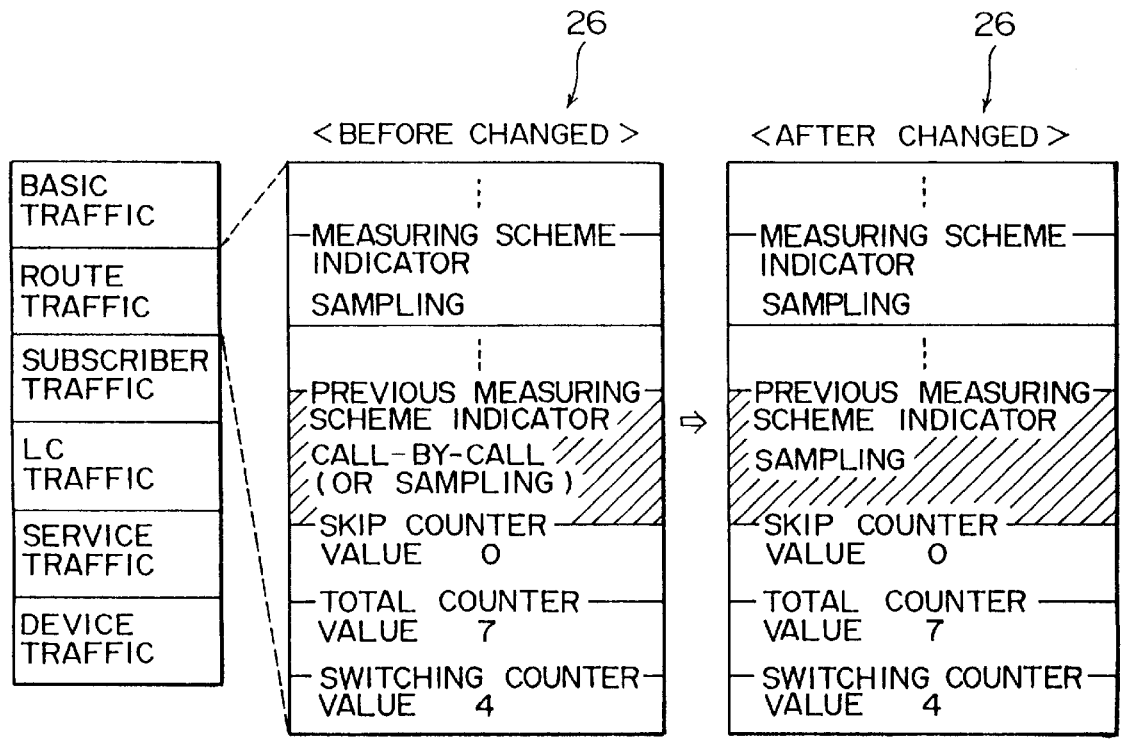
FIGS. 27 to 31 are diagrams each showing the operation of the traffic measuring apparatus according to the fourth embodiment.

When the traffic measuring apparatus 15 is started by the central controller 12, the measuring scheme change control section 18 judges whether the counter value of the skip counter 33 of the counting section 32 is not greater than zero (step D1). When the counter value of the skip counter 33 is not greater than zero (when the result of judgment in step D1 is YES), the measuring scheme change control section 18 causes the previous measuring scheme setting section 28 to set the measuring scheme (e.g., sampling scheme) previously used in the traffic measuring section 16 into the "previous measuring scheme" area of the measuring scheme control table 26, as shown in FIG. 27 (step D2). It is assumed that the skip counter value, the total counter value and the switching counter value of the measuring scheme control table 26 are 0, 7, and 4, respectively, at this point.

Subsequently, the traffic measuring section 15 measures the CC activity ratio through use of the CC activity ratio measuring section 17 (step D3), and compares the measured CC activity ratio with the threshold value in the measuring scheme control table 26 through use of the CC activity ratio/threshold value comparing section 23 of the measuring scheme change control section 18 (step D4).

Figure 28:
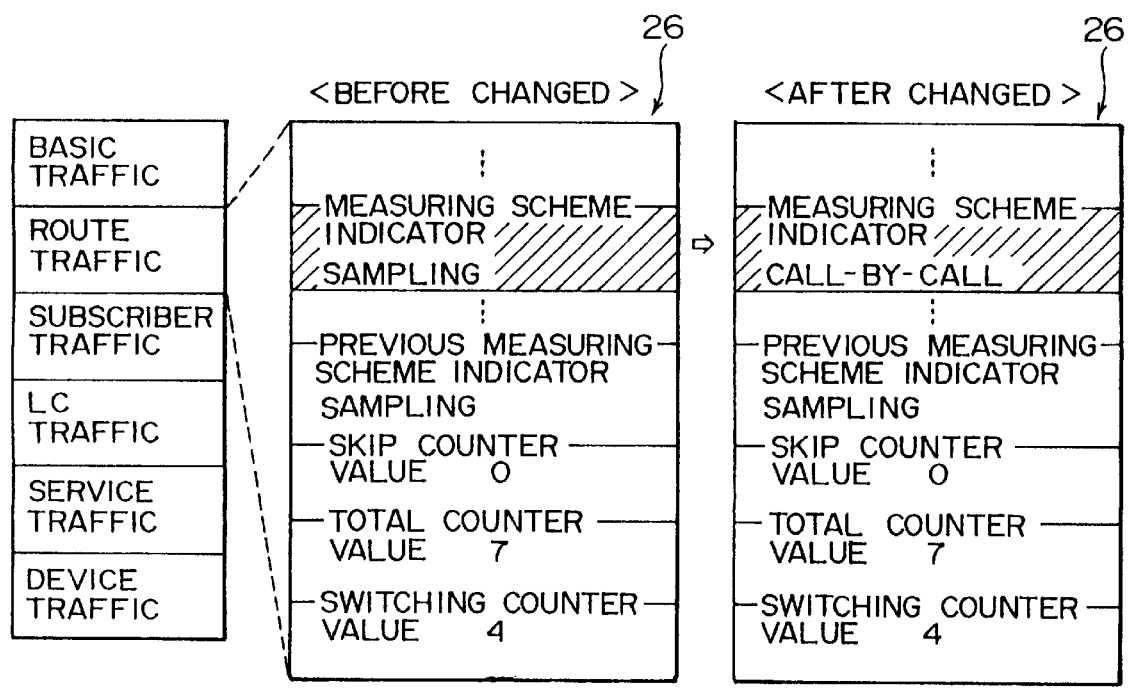

When it is judged that the CC activity ratio is equal to or greater than the threshold value (the result of judgment in step D4 is YES), the CC activity ratio/threshold value comparing section 23 starts the measuring scheme setting section 24 in order to set the "sampling scheme" into the "measuring scheme" area of the corresponding measuring scheme control table 26 (step D5). When it is judged in step C3 that the CC activity ratio is less than the threshold value (the result of judgment in step D4 is NO), the CC activity ratio/threshold value comparing section 23 starts the measuring scheme setting section 24 in order to set the "call-by-call scheme" into the "measuring scheme" area of the corresponding measuring scheme control table 26, as shown in, for example FIG. 28 (step D6).

Figure 29:
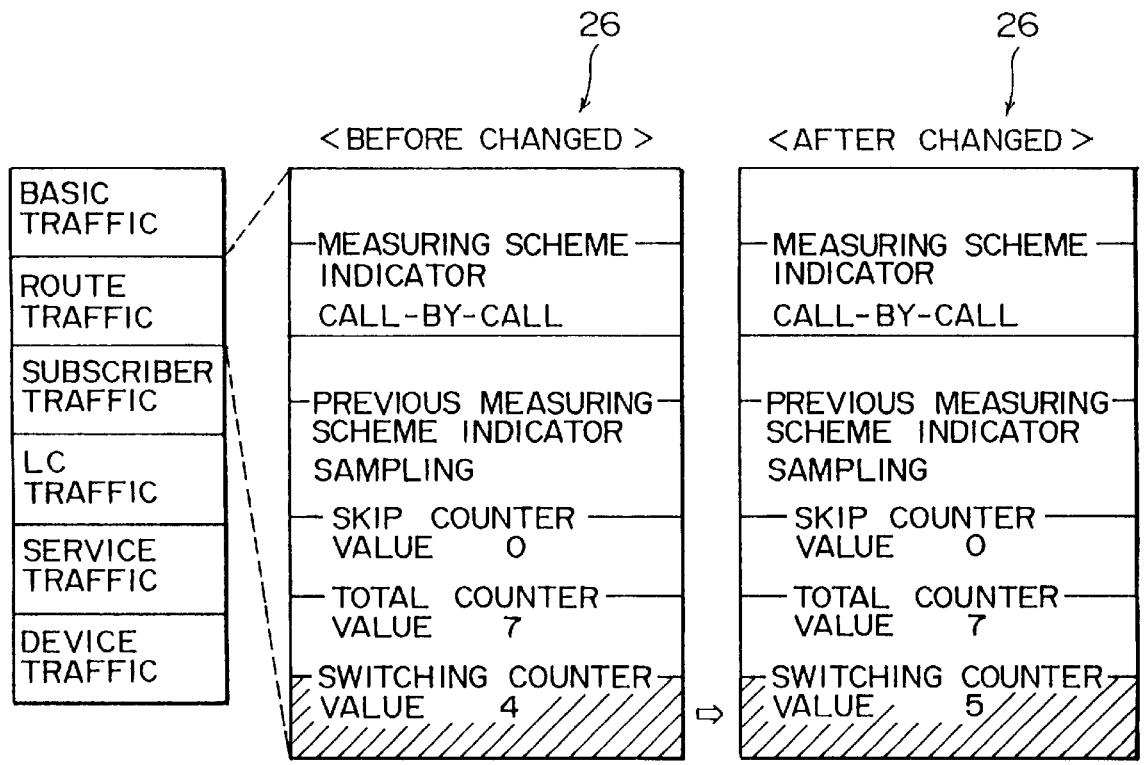
Figure 30:
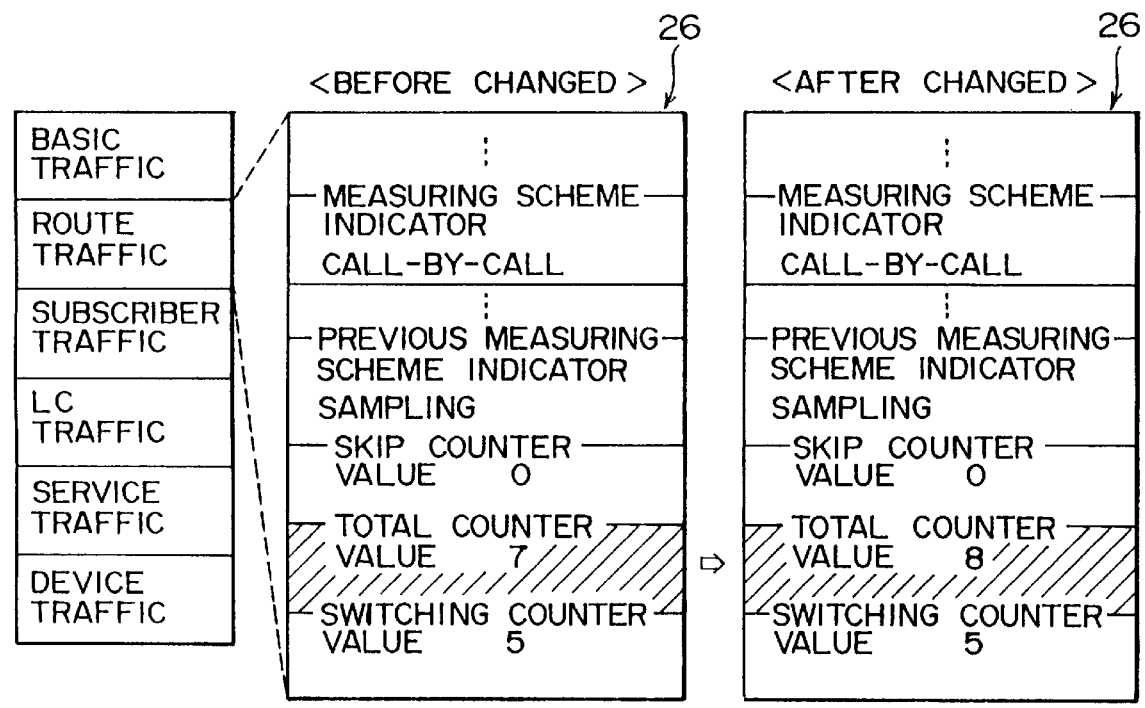

Subsequently, in the measuring scheme change control section 18, the scheme comparing section 29 compares the "measuring scheme" with the "previous measuring scheme" with reference to the measuring scheme control table 26 in order to judge whether the "measuring scheme" differs from the "previous measuring scheme" (step D7). When the "measuring scheme" and the "previous measuring scheme" differ from each other, the switching counter value is incremented (+1) (see FIG. 29, YES route from step D7 to step D8), and the total counter value is incremented (+1) (see FIG. 30, step D9).

When the "measuring scheme" and the "previous measuring scheme" are the same, the switching counter value is maintained unchanged, and only the counter value of the total counter 34 is incremented (+1) (NO route from step D7 to step D9).

Figure 31:
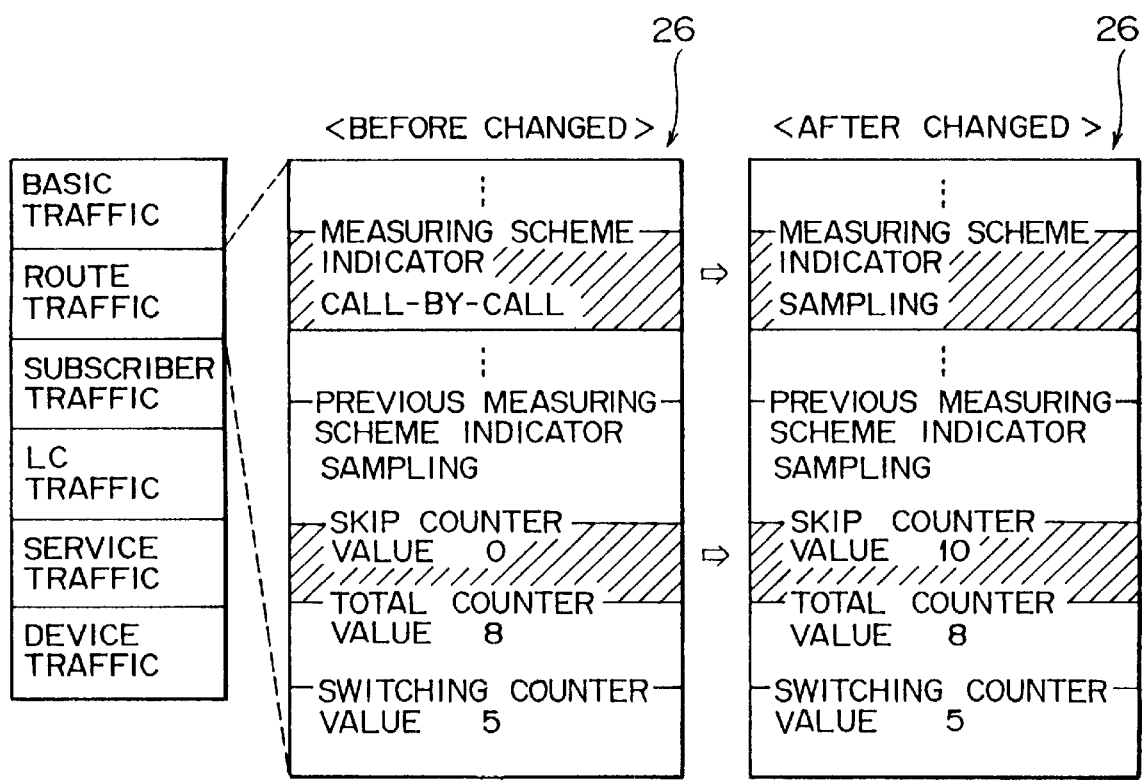

Subsequently, in the measuring scheme change control section 18, the measuring scheme start section 25 judges whether the counter value of the switching counter 35 is greater than 5 (step D10). When the counter value of the switching counter 35 is greater than 5, the counter value of the skip counter 33 is set to 10, and the "sampling scheme" is set into the "sampling scheme" area of the measuring scheme control table 26 through use of the measuring scheme setting section 24 (see FIG. 31, YES route from step D10 to step D11). Subsequently, the respective counter values of the total counter 34 and the switching counter 35 are cleared (step D14).

With this operation, traffic measurement in accordance with the call-by-call scheme is restricted (or skipped) until the counter value of the skip counter 33 decreases from 10 to zero or to a value below zero, i.e., until the measuring apparatus 15 is started 10 times to perform traffic measurement in accordance with the sampling scheme 10 times continuously (150 minutes) (NO route from step D1).

When the counter value of the switching counter 35 is not greater than 5, the it is further judged whether the counter value of the total counter 34 is greater than 10 (NO route from step D10 to step D12). When the counter value of the total counter 34 is greater than 10, it means that the processing for changing the measuring scheme is performed 5 times or less while the traffic measurement processing is started 10 times. In this case, the counter value of the skip counter 32 is cleared (step D13). When the counter value of the total counter 34 is not greater than 10, the counter value of the skip counter 32 is maintained unchanged (NO route from step D12).

After the above-described processing for monitoring the number of times the change control is performed is completed, with reference to the "measuring scheme" area of the measuring scheme control table 26, the measuring scheme start section 25 of the measuring scheme change control section 18 checks whether the "call-by-call scheme" or the "sampling scheme" is set into the "measuring scheme" area (step D15). When the "call-by-call scheme" is set (when the result of judgment in step D15 is YES), the measuring scheme start section 25 starts the call-by-call measuring section 19 of the traffic measuring section 16 in order to perform traffic measurement in accordance with the call-by-call scheme (wherein the call information in the main memory 13 is referred to whenever call control processing is performed (upon generation of a call) in order to collect traffic information: step D16). The detail processing procedure of the step D16 is the same as that shown in FIG. 8(b).

When the "sampling scheme" is set (when the result of judgment in step D15 is NO), the measuring scheme start section 25 starts the sampling measuring section 20 of the traffic measuring section 16 in order to perform traffic measurement in accordance with the sampling scheme (wherein all call information in the main memory 13 is referred to at 20-second intervals in order to collect traffic information: step D17).

Subsequently, the traffic information collected by the call-by-call scheme or the sampling scheme is output to the maintenance terminal 14 (step D18). In the measuring scheme change control section 18, the counter value of the skip counter 33 is decremented (−1) (step D19).

As described above, in the traffic measuring apparatus 15 of the fourth embodiment, when the number of times the processing for changing the traffic measuring scheme is performed becomes equal to or greater than a predetermined value within a predetermined period of time, the processing for changing the traffic measuring scheme is prevented from being performed for a predetermined period of time. Accordingly, in addition to the same advantages as those descried in the first embodiment, the traffic measuring apparatus 15 of the present embodiment has an advantage that the traffic measuring method is prevented from being changed too frequently, which would otherwise occur, for example, when the CC activity ratio changes greatly and is unstable. Thus, it becomes possible to minimize an increase in the load acting on the exchange 1 (central controller 12) stemming from frequent changes of the measuring scheme.

Moreover, in present embodiment, since the measuring scheme is changed to the sampling method that imparts only small load to the call processing when the number of times the processing for changing the traffic measuring scheme is performed becomes equal to or greater than a predetermined value, the load acting on the exchange 1 (central controller 12) can be reduced, so that the processing capability thereof can be increased. However, in the case where importance is attached to the reliability and precision of the results of traffic measurement or in other cases, the measuring scheme may be changed to the call-by-call when the number of times the processing for changing the traffic measuring scheme is performed becomes equal to or greater than a predetermined value.

(b-5) Fifth embodiment

Figure 32:
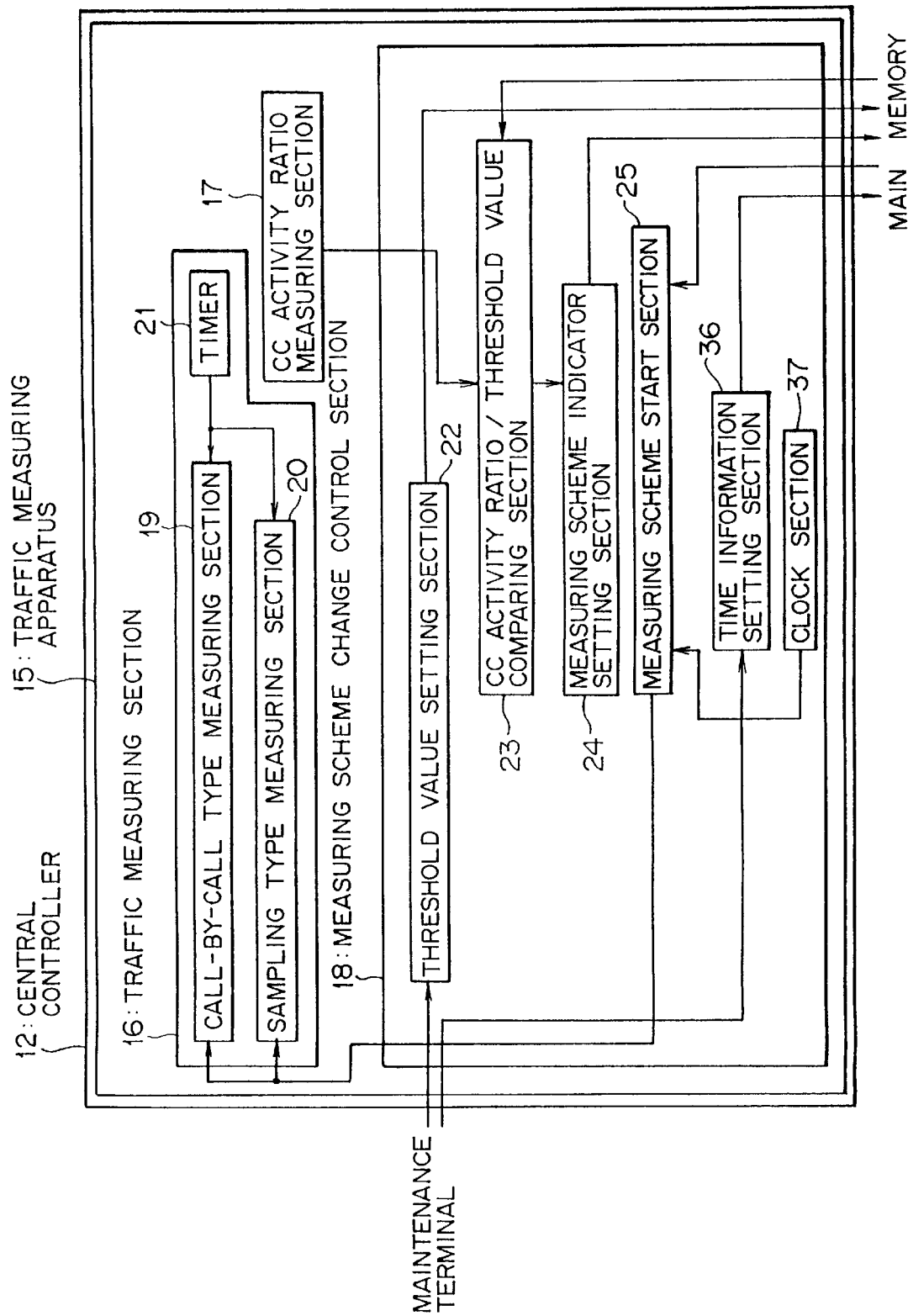
FIG. 32 is a block diagram showing the structure of a traffic measuring apparatus according to a fifth embodiment of the present invention.

FIG. 32 is a block diagram showing the structure of a traffic measuring apparatus according to a fifth embodiment of the present invention. The traffic measuring apparatus 15 shown in FIG. 32 differs from that described as the first embodiment (see FIG. 5) in that the measuring scheme change control section 18 includes a time information setting section 36 and a clock section 37.

Figure 33:
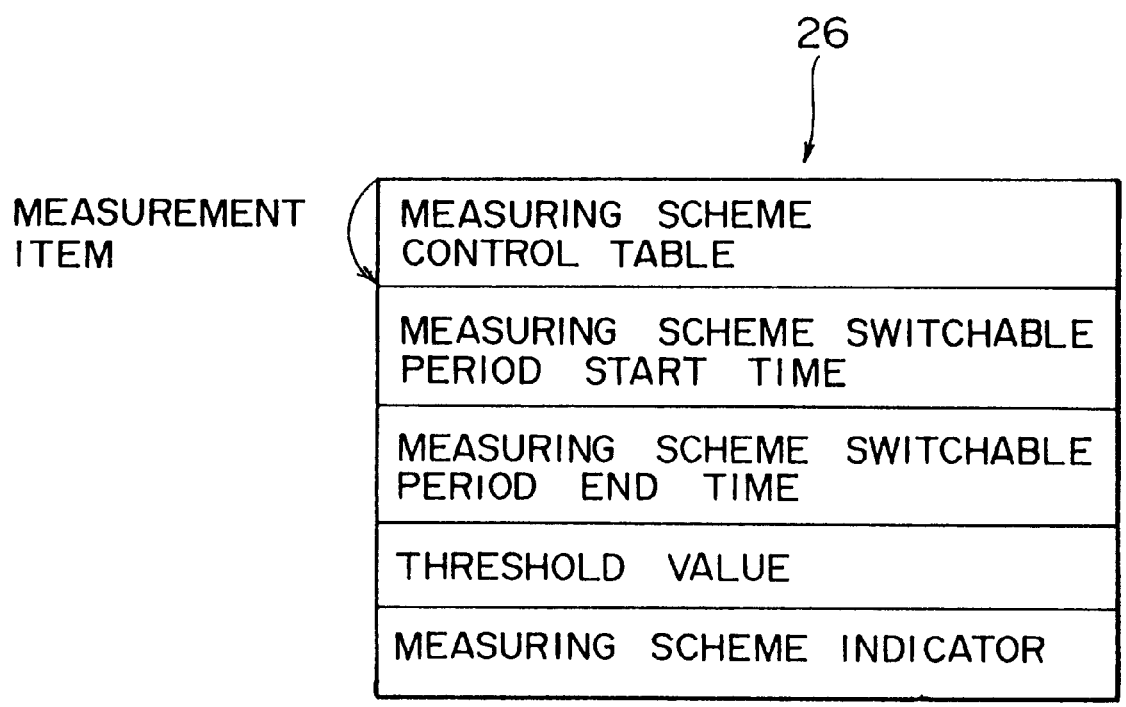
FIG. 33 is a diagram showing an example of a measuring scheme control table used in the traffic measuring apparatus according to the fifth embodiment.

The time information setting section 36 is used for setting a period of time (time information) during which the measuring scheme change control for the traffic measuring section 16 can be performed. In the present embodiment, as shown in, for example, FIG. 33, the period of time is set into the measuring scheme table 26 together with the above-described "threshold" and "measuring scheme" through use of "measurement switchable period start time" and "measurement switchable period end time."

In the present embodiment, the time information setting section 36 receives the above-described time information from the outside maintenance terminal 14, and the time information can be changed freely from the maintenance terminal 14.

The clock section 37 clocks time to obtain the present time. In the present embodiment, when the present time obtained by the clock section 37 is within the period designated by the "measurement switchable period start time" and the "measurement switchable period end time" of the measuring scheme table 26, the measuring scheme used in the traffic measuring section 16 is changed in accordance with the CC activity ratio in the same manner as that described in the first embodiment.

That is, the measuring scheme change control section 18 of the present embodiment performs the measuring scheme change processing for the traffic measuring section 16 based on the time information set by the time information setting section 36.

Figure 34:
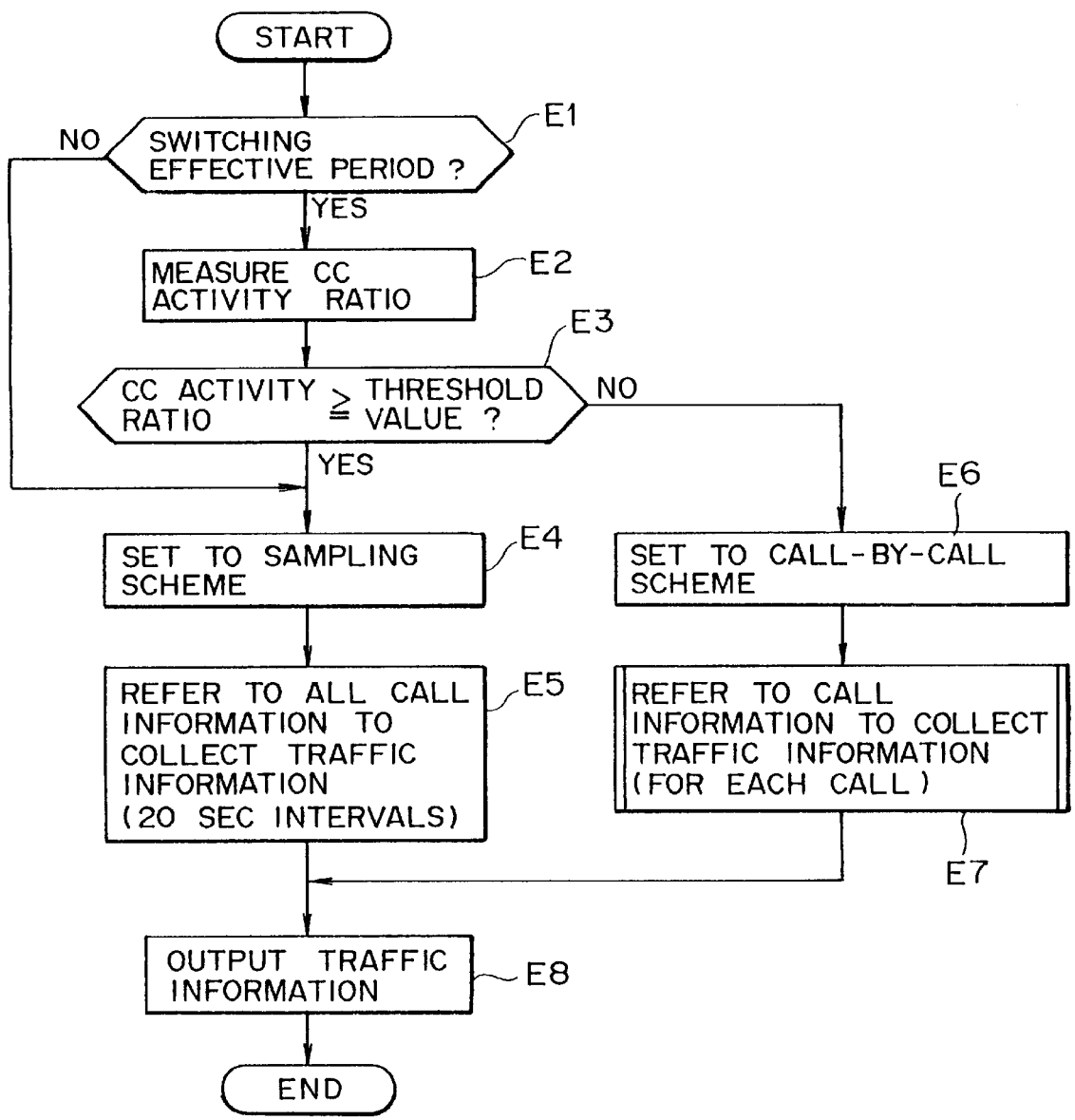
FIG. 34 is a flowchart showing operation of the traffic measuring apparatus according to the fifth embodiment.

The operation of the traffic measuring apparatus 15 of the fifth embodiment having the above-described structure will be described with reference to the flowchart shown in FIG. 34 (steps E1–E8).

When the traffic measuring apparatus 15 is started by the central controller 12, the measuring scheme start section 25 of the measuring scheme change control section 18 judges whether the present time is within the switchable period (effective period) designated by the "measurement switchable period start time" and the "measurement switchable period end time," while referring to the "measurement switchable period start time" and the "measurement switchable period end time" of the corresponding measuring scheme table 26 in the main memory 13 and receiving the present time from the clock section 37 (step E1).

When the present time is within the effective period, the traffic measuring section 15 measures the CC activity ratio through use of the CC activity ratio measuring section 17 (YES route from step E1 to step E2), and compares the measured CC activity ratio with the threshold value in the measuring scheme control table 26 through use of the CC activity ratio/threshold value comparing section 23 (step E3). When it is judged that the CC activity ratio is equal to or greater than the threshold value, the "sampling scheme" is set into the "measuring scheme" area of the measuring scheme control table 26 by the measuring scheme setting section 24 (step E4).

Subsequently, in the measuring scheme change control section 18, the measuring scheme start section 25 refers to the measuring scheme in the measuring scheme control table 26 and starts the sampling measuring section 20 of the traffic measuring section 16. Over a period of 15 minutes, the sampling measuring section 20 of the traffic measuring section 16 refers to all call information of the main memory 13 at 20-second intervals and collects traffic information (step E5). Collected traffic information is output to the maintenance terminal 14 (step E8).

When it is judged in step C3 that the CC activity ratio is less than the threshold value, the "call-by-call scheme" is set into the "measuring scheme" area of the measuring scheme control table 26 by the measuring scheme setting section 24

(step E6). In this case, over a period of 15 minutes, the call-by-call measuring section 19 refers to the corresponding call information of the main memory 13 whenever call control processing is performed and collects traffic information (step E7). Collected traffic information is output to the maintenance terminal 14 (step E8). The detail processing procedure of the step E7 is the same as that shown in FIG. 8(b).

When it is judged in step El that the present time is outside the effective period, the measuring scheme change control section 18 sets the "sampling scheme" into the "measuring scheme" area of the corresponding measuring scheme control table 26 through use of the measuring scheme setting section 24 and causes the traffic measuring section 16 to perform traffic measurement processing in accordance with the sampling scheme (NO route from step E1 to steps E4–E8).

As described-above, in the traffic measuring apparatus 15 of the fifth embodiment, traffic measuring scheme can be changed according to a designated time schedule. Accordingly, in addition to the same advantages as those described in the first embodiment, the traffic measuring apparatus 15 of the fifth embodiment has an advantage that traffic measurement can be performed in accordance with optimal measuring methods corresponding to time zones. For example, the traffic measurement is performed such that in time zones in which the number of generated calls increases greatly and therefore the CC activity ratio increases abruptly, the traffic measurement is always performed in accordance with the sampling scheme that imparts only small load to the call processing. Accordingly, traffic measurement can be performed in more detail and flexibly.

Since the above-described time information can be changed freely from the maintenance terminal 14, the time for changing the measuring method can be set and changed arbitrarily. This feature also contributes to the versatility of the traffic measuring apparatus 15.

In the present embodiment, the measuring scheme used in the traffic measuring section 16 is set to the "sampling scheme" unconditionally when the present time is outside the above-described effective period. However, the measuring scheme may be set to the "call-by-call scheme" when the present time is outside the effective period.

(c) Others

In the above-described embodiments, the measuring scheme is changed automatically in accordance with the load (CC activity ratio) of the central controller 12. However, such change may be performed directly through input of change instruction information (call-by-call scheme, sampling scheme, etc.) from the maintenance terminal 14. In this case, such change instruction information may be received by the above-described measuring scheme setting section 24.

Also, the functions of the measuring scheme change control section 18 described in the above-described embodiments may be combined freely. Moreover, in the above-described embodiments, the measuring scheme used in the traffic measuring section 16 is set to one of the "call-by-call scheme" and the "sampling scheme." However, other measuring schemes may be used. Also, in the above-described embodiments, the measuring scheme is switched between two kinds of measuring schemes; i.e., the "call-by-call scheme" and the "sampling scheme." However, the present invention is not limited thereto, and the measuring scheme may be switched (or selected) among three or more kinds of measuring schemes.

The "threshold value," "all-time measuring scheme," and "time information" used in the above-described embodiments are not necessarily required to be set from the maintenance terminal 14, and they may be fixedly set within the main memory 13. Also, in the above-described embodiments, the CC activity ratio is measured as a factor that indicating the load of the central controller 12 and the traffic measurement is carried out in accordance with a measuring method corresponding to the CC activity ratio. However, any other factor that indicates the load may be measured, and the traffic measurement may be carried out in accordance with a measuring method corresponding to the factor.

The present invention is not limited to the above-described embodiments and may be practiced in modified forms without departing from the scope of the present invention.

What is claimed is:

1. A traffic measuring apparatus for measuring traffic in a communications exchange which traffic results from call control for a multiplicity of terminals adapted to be associated with the communications exchange, comprising:

a traffic measuring section for measuring the traffic in accordance with a selective one of two or more measuring methods;

a load measuring section for measuring a call control load; and a measuring method change control section for making a changeover between said two or more measuring methods in accordance with the level of the call control load.

2. A traffic measuring apparatus according to claim 1, wherein said two or more measuring methods are first and second measuring methods, said first measuring method being such that the traffic is measured in terms of occurrences of calls and said second measuring method being such that the traffic is measured at predetermined intervals.

3. A traffic measuring apparatus according to claim 2, wherein said measuring method change control section includes a threshold value setting section for setting a threshold value for the call control load, and a comparing section for comparing the call control load which is measured by said load measuring section with the threshold value set by said threshold value setting section, and wherein when said comparing section judges that the call control load is equal to or greater than the threshold value, said measuring method change control section controls said traffic measuring section in such a way that said traffic measuring section measures the traffic using the second measuring method, and when said comparing section judges that the call control load is less than the threshold value, said measuring method change control section controls said traffic measuring section in such a way that said traffic measuring section measures the traffic using the first measuring method.

4. A traffic measuring apparatus according to claim 3, wherein said threshold value setting section receives the threshold value from an external source.

5. A traffic measuring apparatus according to claim 1, wherein said traffic measuring section measures the traffic in accordance with predetermined measurement items, and said measuring method change control section makes a changeover between said two or more measuring methods to be used in said traffic measuring section one for each of the measurement items.

6. A traffic measuring apparatus according to claim 5, wherein said measuring method change control section has a measuring method setting section for setting a different measuring method for each of said measurement items.

7. A traffic measuring apparatus according to claim 6, wherein said measuring method setting section receives the measuring method from an external source.

8. A traffic measuring apparatus according to claim 1, wherein said measuring method change control section makes a changeover between said measuring methods upon reception of a measuring-method-changeover instruction.

9. A traffic measuring apparatus according to claim 1, wherein said measuring method change control section includes a confirmation information output section for outputting confirmation information that is used for confirming whether changing of the measuring method is permitted, and a reception section for receiving a response to the confirmation information, and wherein said measuring method change control section defers the changing of the measuring method until said reception section receives a request for change as the response to the confirmation information.

10. A traffic measuring apparatus according to claim 1, wherein said measuring method change control section includes a change number count section for counting up the number of the changeovers made between the measuring methods and defers the changing of the measuring method for a predetermined period of time when the number of the changeovers counted up by said change number count section becomes equal to or greater than a predetermined value.

11. A traffic measuring apparatus according to claim 1, wherein said measuring method change control section includes a time information setting section for setting time information indicating time periods within which the respective changeovers may be made between the measuring methods, and wherein said measuring method change control section makes a changeover between the measuring methods based on the time information set by said time information setting section.

12. A traffic measuring apparatus according to claim 11, wherein said time information setting section receives the time information from an external source.

13. A traffic measuring apparatus for measuring traffic in a communications exchange which traffic results from call control for a multiplicity of terminals adapted to be associated with the communications exchange, comprising:

a load measuring section for measuring a call control load;

a traffic measuring section for measuring the traffic in accordance with a selective one of a plurality of kinds of measuring methods; and a load measuring method selecting section for selecting one of the measuring methods in accordance with the status of the call control load measured by said load measuring section.

* * * * *